(12) United States Patent
Heckmeier et al.

(10) Patent No.: US 7,078,079 B2
(45) Date of Patent: *Jul. 18, 2006

(54) LIQUID-CRYSTALLINE MEDIUM

(75) Inventors: Michael Heckmeier, Hemsbach (DE);
Brigitte Schuler, Grossostheim (DE);
Achim Goetz, Alsbach-Haehnlein (DE);
Peer Kirsch, Seeheim-Jugenheim (DE);
Detlef Pauluth, Ober-Ramstadt (DE);
Matthias Bremer, Darmstadt (DE);
Sabine Schoen, Herten (DE); Georg Lüssem, Ober-Ramstadt (DE);
Christian Hock, Mainaschaff (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/433,002

(22) PCT Filed: Sep. 20, 2001

(86) PCT No.: PCT/EP01/10901

§ 371 (c)(1),
(2), (4) Date: May 29, 2003

(87) PCT Pub. No.: WO02/46329

PCT Pub. Date: Jun. 13, 2002

(65) Prior Publication Data

US 2004/0173774 A1   Sep. 9, 2004

(30) Foreign Application Priority Data

Dec. 7, 2000 (DE) ................ 100 60 744
May 25, 2001 (DE) ................ 101 25 706

(51) Int. Cl.
 *C09K 19/30* (2006.01)
 *C09K 19/34* (2006.01)
 *C09K 19/32* (2006.01)
 *C09K 19/12* (2006.01)
 *C09K 19/20* (2006.01)

(52) U.S. Cl. ............ 428/1.1; 252/299.61; 252/299.62; 252/299.63; 252/199.66; 252/299.67

(58) Field of Classification Search ............... 428/1.1; 252/299.61, 299.63, 299.66, 299.67, 299.01, 252/299.62
See application file for complete search history.

(56) References Cited

U.S. PATENT DOCUMENTS

| | | | |
|---|---|---|---|
| 6,287,648 B1 | 9/2001 | Tarumi et al. | |
| 6,465,059 B1* | 10/2002 | Bremer et al. | 428/1.1 |
| 6,468,608 B1* | 10/2002 | Bremer et al. | 428/1.1 |
| 6,541,082 B1* | 4/2003 | Lussem et al. | 428/1.1 |
| 6,592,951 B1* | 7/2003 | Heckmeier et al. | 428/1.1 |
| 6,706,338 B1* | 3/2004 | Kirsch et al. | 428/1.1 |
| 6,780,477 B1* | 8/2004 | Kirsch et al. | 428/1.1 |
| 6,827,990 B1* | 12/2004 | Heckmeier et al. | 428/1.1 |
| 2003/0134056 A1* | 7/2003 | Heckmeier et al. | 428/1.1 |

FOREIGN PATENT DOCUMENTS

| | | |
|---|---|---|
| DE | 40 15 681 | 11/1991 |
| DE | 19748109 | * 5/1999 |
| DE | 198 14 550 | 10/1999 |
| DE | 199 61 015 | 9/2000 |
| WO | WO99/50210 | * 7/1999 |
| WO | WO 01 46336 | 6/2001 |

* cited by examiner

*Primary Examiner*—Shean C. Wu
(74) *Attorney, Agent, or Firm*—Millen, White, Zelano, Branigan, P.C.

(57) ABSTRACT

The invention relates to a liquid-crystalline medium based on a mixture of polar compounds of positive dielectric anisotropy, characterised in that it comprises one or more compounds of the general formula I

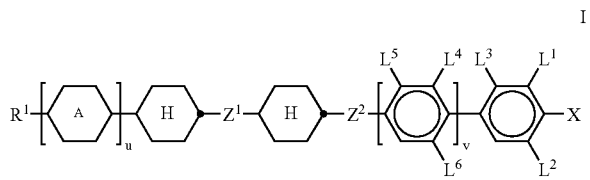

in which $R^1$,

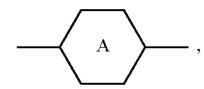

$L^1$, $L^2$, $L^3$, $L^4$, $L^5$, $L^6$, $Z^1$, $Z^2$, X, v and u are as defined in claim 1.

40 Claims, No Drawings

LIQUID-CRYSTALLINE MEDIUM

The present invention relates to a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
  extended nematic phase range (in particular down to low temperatures)
  the ability to switch at extremely low temperatures (outdoor use, automobile, avionics)
  increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has the object of providing media, in particular for MLC, TN or STN displays of this type, which do not have the above-mentioned disadvantages or only do so to a reduced extent, and preferably simultaneously have very high specific resistances and low threshold voltages. In particular, it is possible to use the compounds of the formula I for the preparation of low $V_{th}$ mixtures which have a very good $\gamma_1$/clearing point ratio and relatively low $\Delta n$ values. The mixtures according to the invention are particularly suitable for low $\Delta n$ applications. The mixtures according to the invention are preferably used in reflective and transflective applications.

It has now been found that this object can be achieved if media according to the invention are used in displays.

The invention thus relates to a liquid-crystalline medium based on a mixture of polar compounds of positive or negative dielectric anisotropy, characterised in that it comprises one or more compounds of the general formula I

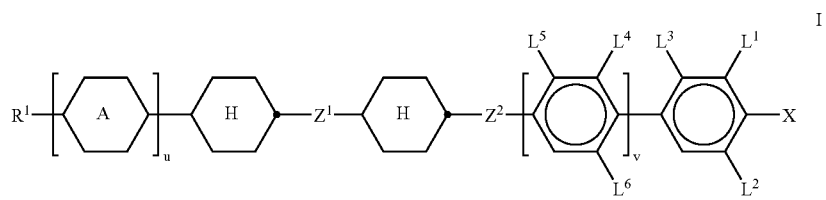

in which
R¹ is an alkyl radical having from 1 to 12 carbon atoms which is unsubstituted, monosubstituted by CN or CF₃ or at least monosubstituted by halogen, where one or more CH₂ groups in these radicals may also, in each case independently of one another, be replaced by —O—, —S—,

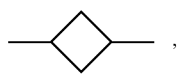

—CH═CH—, —C≡C—, —CO—, —CO—O—, —O—CO— or —O—CO—O— in such a way that O atoms are not linked directly to one another,

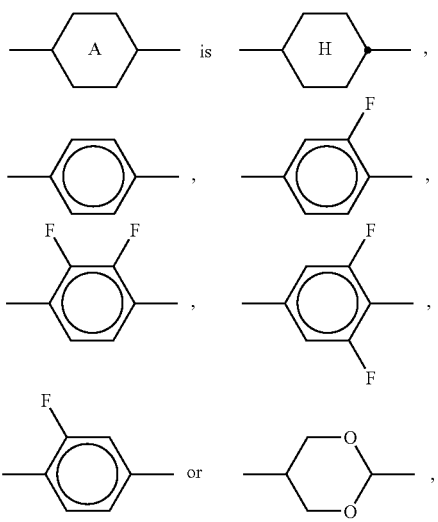

$L^{1-6}$ are each, independently of one another, H or F,
$Z^1$ and $Z^2$ are each, independently of one another, —CF₂CF₂— or a single bond, where $Z^1 \neq Z^2$,
X is F, Cl, CN, OCN, NCS, SCN, SF₅, an unsubstituted alkyl or alkoxy radical, a halogenated alkyl radical, a halogenated alkenyl radical, a halogenated alkoxy radical or a halogenated alkenyloxy radical having up to 6 carbon atoms, and
u is 0 or 1, and
v is 0 or 1.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

If R¹ is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, methoxy, octyloxy, nonyloxy, decyloxy or undecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8-, or 9-oxadecyl.

If R¹ is an alkyl radical in which one CH₂ group has been replaced by —CH═CH—, this may be straight-chain or branched. It is preferably straight-chain and has from 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, 4- or -5-enyl, hept-1-, -2-, -3-, 4-, -5- or -6-enyl, oct-1-, -2-, -3-, 4-, -5-, -6- or -7-enyl, non-1-, -2-, -3-, -4-, -5-, -6-, -7- or -8-enyl, or dec--1-, -2-, -3-, -4-, -5-, -6-, -7-, -8- or -9-enyl.

If R¹ is an alkyl radical in which one CH₂ group has been replaced by —O— and one has been replaced by —CO—, these are preferably adjacent. These thus contain an acyloxy group —CO—O— or an oxycarbonyl group —O—CO. These are preferably straight-chain and have from 2 to 6 carbon atoms. Accordingly, they are in particular acetoxy, propionyloxy, butyryloxy, pentanoyloxy, hexanoyloxy, acetoxymethyl, propionyloxymethyl, butyryl-oxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyi)ethyl, 3-(methoxycarbonyl)-propyl, 3-(ethoxycarbonyl)propyl or 4-(methoxycarbonyl)butyl.

If $R^1$ is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 12 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-meth-acryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ is an alkyl or alkenyl radical which is monosubstituted by CN or $CF_3$, this radical is preferably straight-chain. The substitution by CN or $CF_3$ is in any desired position.

If $R^1$ is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds of the formula I which have wing groups $R^1$ which are suitable for polymerisation reactions are suitable for the preparation of liquid-crystalline polymers.

Compounds containing branched wing groups $R^1$ may occasionally be of importance owing to better solubility in the conventional liquid-crystalline base materials, but in particular as chiral dopants if they are optically active. Smectic compounds of this type are suitable as components of ferroelectric materials.

Compounds of the formula I having $S_A$ phases are suitable for thermally addressed displays.

Branched groups of this type generally contain not more than one chain branch. Preferred branched radicals $R^1$ are isopropyl, 2-butyl (=1-methyl-propyl), isobutyl (=2-methyl-propyl), 2-methylbutyl, isopentyl (=3-methyl-butyl), 2-methylpentyl, 3-methylpentyl, 2-ethylhexyl, 2-propylpentyl, iso-propoxy, 2-methylpropoxy, 2-methylbutoxy, 3-methylbutoxy, 2-methyl-pentoxy, 3-methylpentoxy, 2-ethylhexyloxy, 1-methylhexyloxy and 1-methylheptyloxy.

If $R^1$ is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxy-propyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes. Besides for reflective displays, the mixtures according to the invention are also suitable for IPS (in plane switching) applications, OCB (optically controlled birefringence) applications and VA (vertical alignment) applications.

The liquid-crystal mixtures according to the invention enable a significant widening of the available parameter latitude.

The achievable combinations of clearing point, rotational viscosity $\gamma_1$ low $\Delta n$ and dielectric anisotropy are far superior to previous materials from the prior art.

The requirement for a high clearing point, a nematic phase at low temperature and a high $\Delta\epsilon$ has hitherto only been achieved to an inadequate extent. Although mixtures such as, for example, MLC-6424 have a similar properties to the mixtures according to the invention, they have, however, significantly worse values for the rotational viscosity $\gamma_1$.

Other mixture systems have comparable flow viscosities $v_{20}$ and $\Delta\epsilon$ values, but only have clearing points in the region of 60° C.

The liquid-crystal mixtures according to the invention, while retaining the nematic phase down to −20° C. and preferably down to −30° C., particularly preferably down to 40° C., enable clearing points above 80° C., preferably above 90° C., particularly preferably above 100° C., simultaneously dielectric anisotropy values $\Delta\epsilon$ of $\geq 6$, preferably $\geq 8$, and a high value for the specific resistance to be achieved, enabling excellent STN and MLC displays to be obtained. In particular, the mixtures are characterised by low operating voltages. The TN thresholds are below 2.0 V, preferably below 1.8 V, particularly preferably <1.7 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975] are used, where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm²·s⁻¹, particularly preferably <150 mm²·s⁻¹. The rotational viscosity $\gamma_1$ of the mixtures according to the invention at 20° C. is preferably <180 mPa·s, particularly preferably <150 mPa·s. The nematic phase range is preferably at least 90°, in particular at least 100°. This range preferably extends at least from −20° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenyl-cyclohexanes of the formula

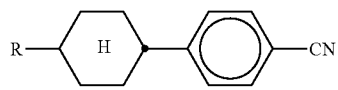

or esters of the formula

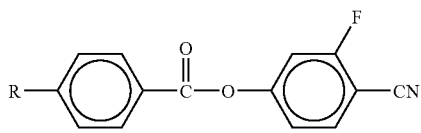

instead of the compounds of the formula I.

The UV stability of the mixtures according to the invention is also considerably better, i.e. they exhibit a significantly smaller decrease in the HR on exposure to UV.

The media according to the invention are preferably based on a plurality of (preferably two or more) compounds of the formula 1, i.e. the proportion of these compounds is 5–95%, preferably 10–60% and particularly preferably in the range 15–50%.

The individual compounds of the formulae I to XVIII and their sub-formulae which can be used in the media according to the invention are either known or they can be prepared analogously to the known compounds.

Preferred embodiments are indicated below:

Medium comprises one or more compounds of the formulae I1 to I32:

I1

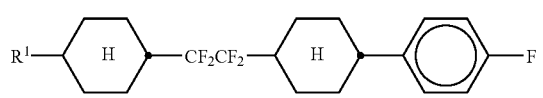

I2

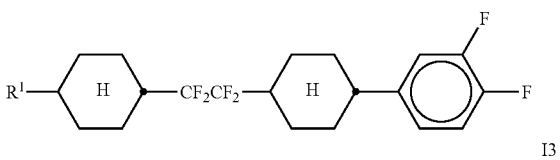

I3

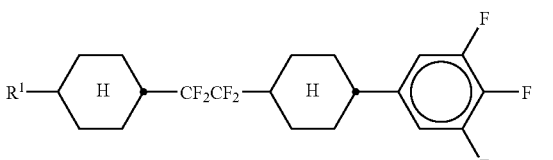

I4

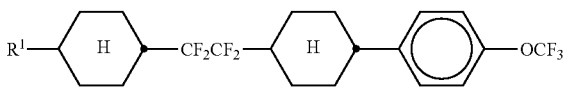

I5

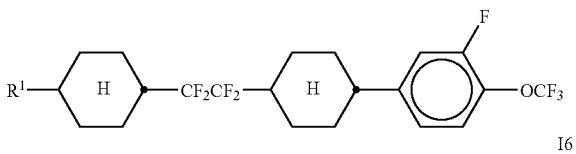

I6

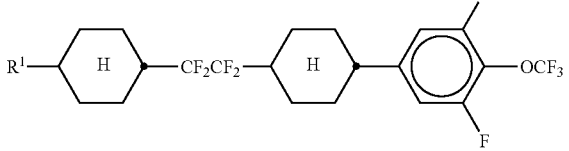

I7

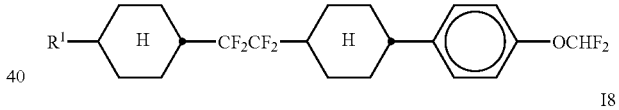

I8

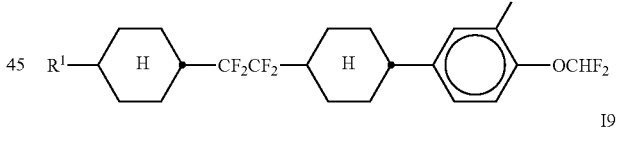

I9

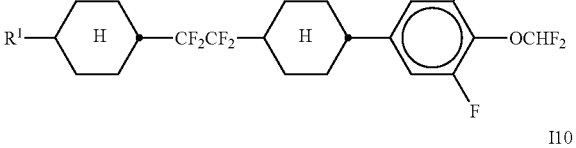

I10

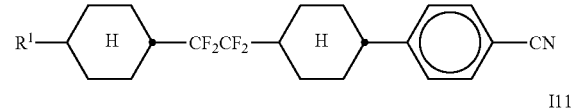

I11

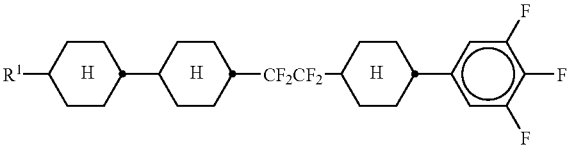

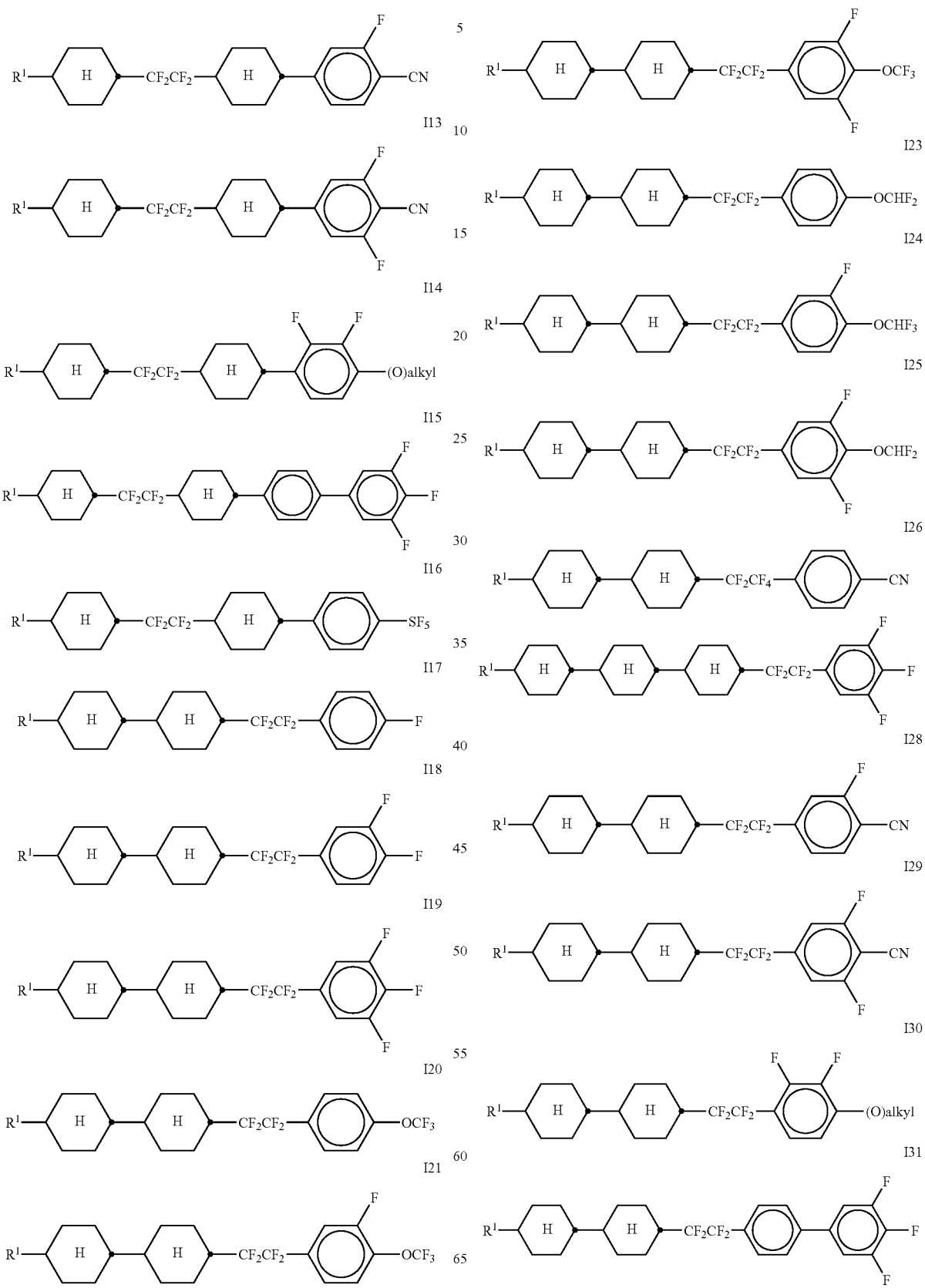

-continued

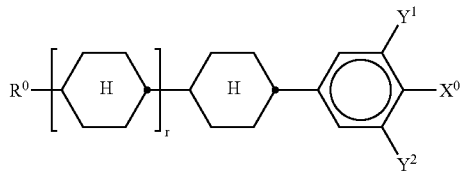

I32

X is preferably F, Cl, CN, OCN, NCS, SCN, SF₅, OCH₃, CH₃, OC₂H₅, C₂H₅, OC₃H₇, C₃H₇, CF₃, CF₂H, OCF₃, OCF₂H, OCFHCF₃, OCFHCH₂F, OCFHC₂HF, OCF₂CH₃, OCF₂CH₂F, OCF₂CHF₂, OCF₂CF₂CF₂H, OCF₂CF₂CH₂F, OCFHCF₂CF₃, OCFHCF₂CHF₂, OCFHCFHCF₃, OCH₂CF₂CF₃, OCF₂CF₂CF₃, OCF₂CFHCHF₂, OCF₂CH₂CHF₂, OCFHCF₂CHF₂, OCFHCFHCHF₂, OCFHCH₂CF₃, OCH₂CFHCF₃, OCH₂CF₂CHF₂, OCF₂CFHCH₃, OCF₂CH₂CHF₂, OCFHCF₂CH₃, OCFHCFHCHF₂, OCFHCH₂CF₃, OCH₂CF₂CHF₂, OCH₂CFHCHF₂, OCF₂CH₂CH₃, OCFHCFHCH₃, OCFHCH₂CHF₂, OCH₂CF₂CH₃, OCH₂CFHCHF₂, OCH₂CH₂CHF₂, OCHCH₂CH₃, OCH₂CFHCH₃, OCH₂CH₂CHF₂, OCClFCF₃, OCClFCClF₂, OCClFCHF₂, OCFHCCl₂F, OCClFCHF₂, OCClFCClF₂, OCF₂CHCl₂, OCF₂CHCl₂, OCF₂CCl₂F, OCF₂CClFH, OCF₂CClF₂, OCF₂CF₂CClF, OCF₂CF₂CCl₂F, OCClFCF₂CF₃, OCClFCF₂CHF₂, OCClFCF₂CClF₂, OCClFCFHCF₃, OCClFCClFCF₃, OCCl₂CF₂CF₃, OCClHCF₂CF₃, OCClFCF₂CF₃, OCClFCClFCF₃, OCF₂CClFCHF₂, OCF₂CF₂CCl₂F, OCF₂CCl₂CHF₂, OCF₂CH₂CClF₂, OCClFCF₂CFH₂, OCFHCF₂CCl₂F, OCClFCFHCHF₂, OCClFCClFCF₂H, OCFHCFHCClF₂, OCClFCH₂CF₃, OCFHCCl₂CF₃, OCCl₂CFHCF₃, OCH₂CClFCF₃, OCCl₂CF₂CF₂H, OCH₂CF₂CClF₂, OCF₂CClFCH₃, OCF₂CFHCCl₂H, OCF₂CCl₂CFH₂, OCF₂CH₂CCl₂F, OCClFCF₂CH₃, OCFHCF₂CCl₂H, OCClFCClFCHF₂, OCFHCFHCCl₂F, OCClFCH₂CF₃, OCFHCCl₂CF₃, OCCl₂CF₂CFH₂, OCH₂CF₂CCl₂F, OCCl₂CFHCF₂H, OCClHCClFCF₂H, OCF₂CClHCClH₂, OCF₂CH₂CCl₂H, OCClFCFHCH₃, OCF₂CClFCCl₂H, OCClFCH₂CFH₂, OCFHCCl₂CFH₂, OCCl₂CF₂CH₃, OCH₂CF₂CClH₂, OCCl₂CFHCFH₂, OCH₂CClFCFCl₂, OCH₂CH₂CF₂H, OCClHCClHCF₂H, OCH₂CCl₂CF₂H, OCClFCH₂CH₃, OCFHCH₂CCl₂H, OCClHCFHCClH₂, OCH₂CFHCCl₂H, OCCl₂CH₂CF₂H, OCH₂CCl₂CF₂H, CH═CF₂, OCH═CF₂, CF═CF₂, OCF═CF₂, CF═CHF, OCF═CHF, CH═CHF, OCH═CHF, CF₂CH₂CF₃, CF₂CHFCF₃ in particular F, Cl, CN, CF₃, CHF₂, OCF₃, OCHF₂, OCFHCF₃, OCFHCHF₂, OCFHCHF₂, OCF₂CH₃, OCF₂CHF₂, OCF₂CHF₂, OCF₂CF₂CHF₂, OCF₂CF₂CHF₂, OCFHCF₂CF₃, OCFHCF₂CHF₂, OCF₂CF₂CF₃, OCF₂CF₂CClF₂, OCClFCF₂CF₃, CH═CHF₂, OCH₃, OC₂H₅ or OC₃H₇.

Medium additionally comprises one or more compounds selected from the group consisting of the general formulae II to VIII:

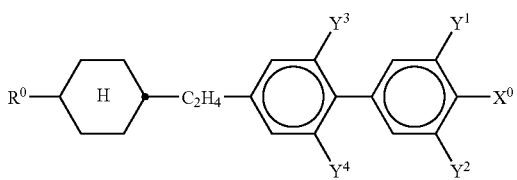

II

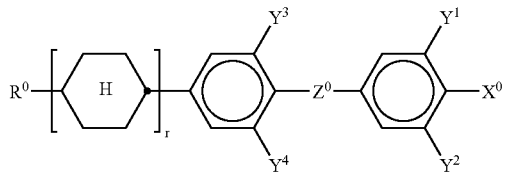

III

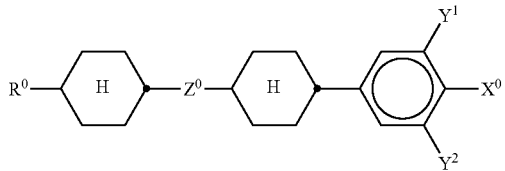

IV

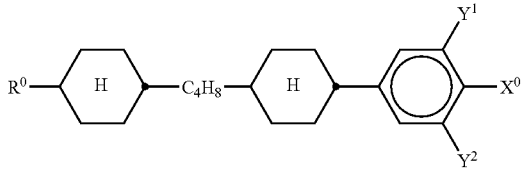

V

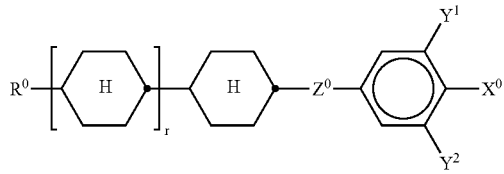

VI

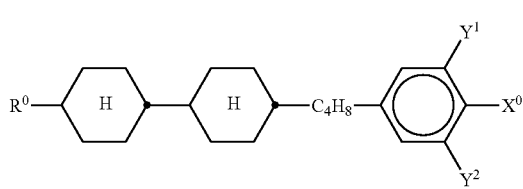

VII

VIII in which the individual radicals have the following meanings:

R₀: n-alkyl, oxaalkyl, fluoroalkyl or alkenyl, each having up to 9 carbon atoms

X⁰: F, Cl, halogenated alkyl, alkenyl or alkoxy having from 1 to 6 carbon atoms, $Z^0$: —$C_2H_4$—, —$CH_2O$—, —COO—, —$OCH_2$—, —$OCF_2$—, —$CF_2O$—, —$C_2F_4$—, —$CH_2CF_2$— or $CF_2CH_2$—, $Y^1$, $Y^2$, $Y^3$ and $Y^4$: each, independently of one another, H or F, r: 0 or 1

The compound of the formula IV is preferably

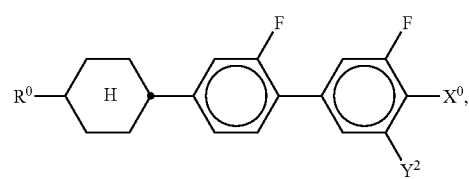
IVa

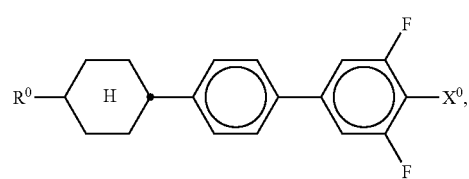
IVb

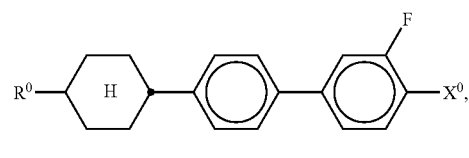
IVc

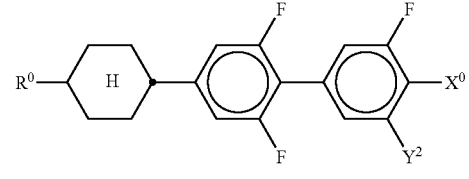
IVd

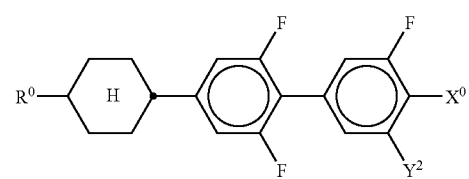
IVe

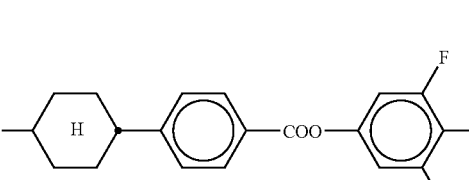
IVf

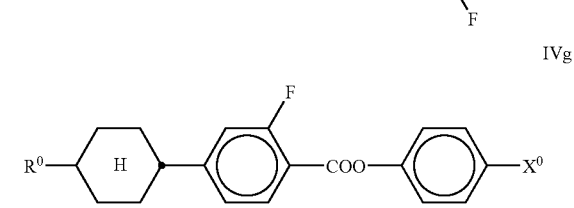
IVg

The medium additionally comprises one or more dioxanes of the formulae D1 to D4:

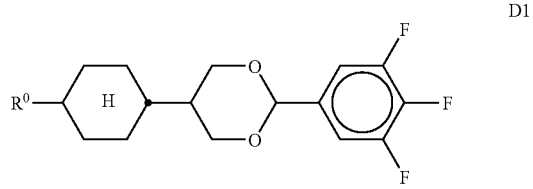
D1

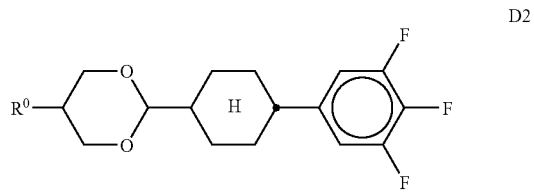
D2

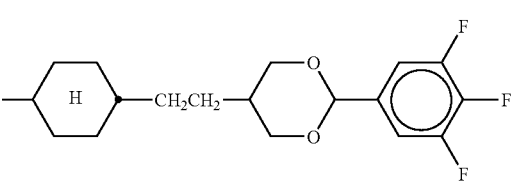
D3

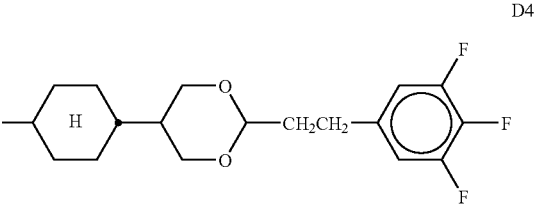
D4 in which $R^0$ is as defined above.

The medium additionally comprises one or more compounds selected from the group consisting of the general formulae IX to XVIII:

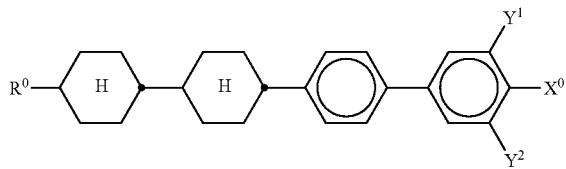
IX

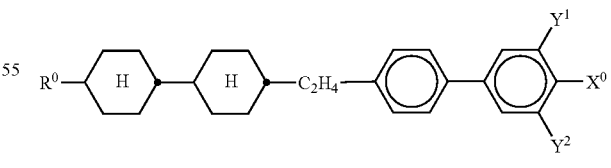
X

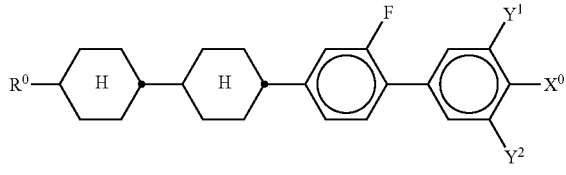
XI

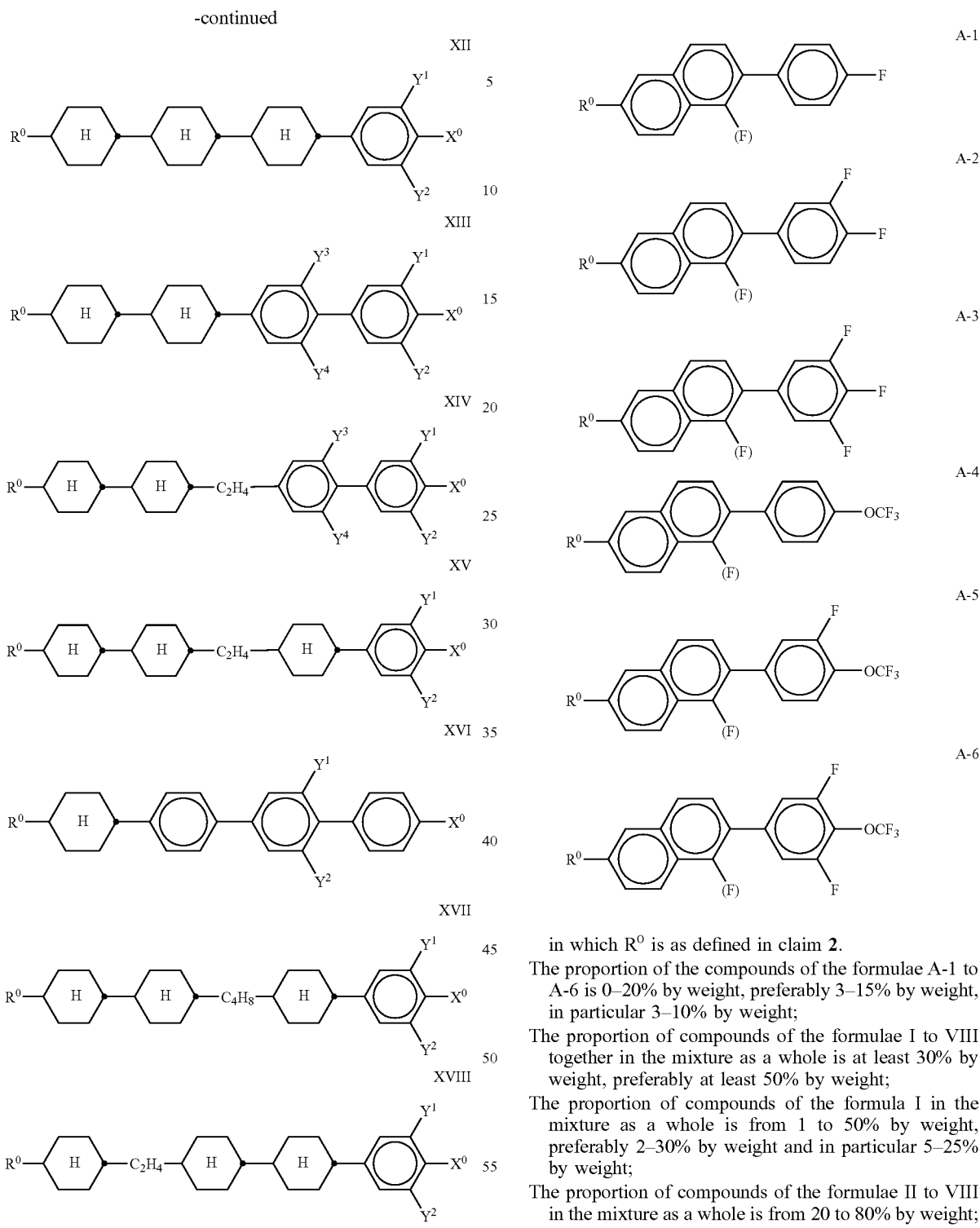

in which $R^0$, $X^0$, $Y^1$ and $Y^2$ are each, independently of one another, as defined in claim 2. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium additionally comprises one or more compounds having fused rings, of the formulae A-1 to A-6:

in which $R^0$ is as defined in claim 2.

The proportion of the compounds of the formulae A-1 to A-6 is 0–20% by weight, preferably 3–15% by weight, in particular 3–10% by weight;

The proportion of compounds of the formulae I to VIII together in the mixture as a whole is at least 30% by weight, preferably at least 50% by weight;

The proportion of compounds of the formula I in the mixture as a whole is from 1 to 50% by weight, preferably 2–30% by weight and in particular 5–25% by weight;

The proportion of compounds of the formulae II to VIII in the mixture as a whole is from 20 to 80% by weight;

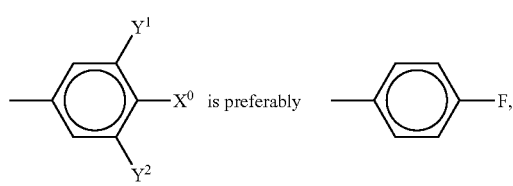

-continued

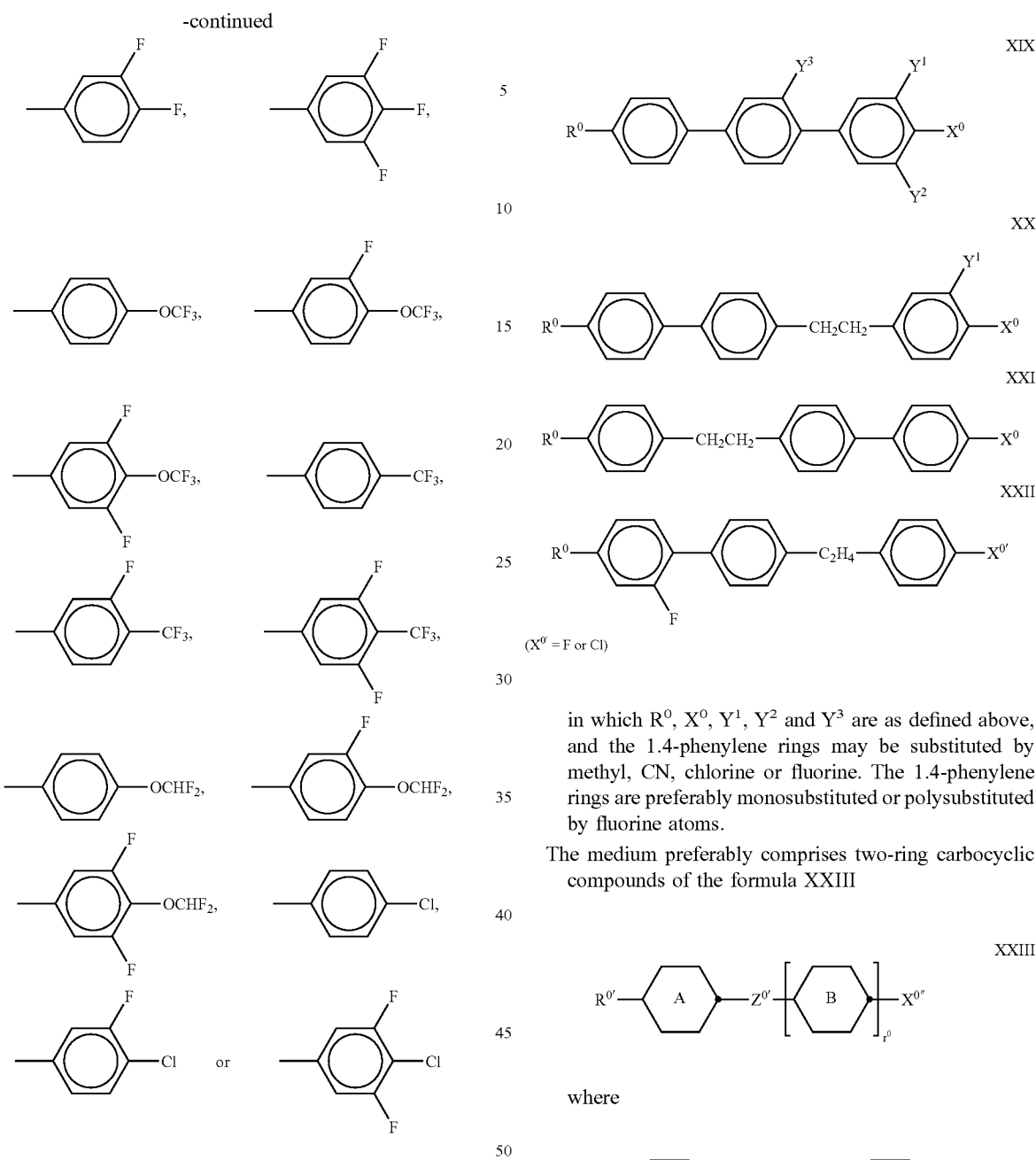

The medium comprises one or more compounds of the formulae II, III, IV, V, VI, VII or VIII;

$R^0$ is straight-chain alkyl or alkenyl having from 2 to 7 carbon atoms;

The medium essentially consists of compounds of the formulae I to VIII;

The medium preferably comprises one, two or three compounds of the formula I;

The medium comprises a mixture of compounds of the formula I in which $R^1$ is methyl, ethyl, n-$C_3H_7$, n-$C_4H_9$, n-$C_5H_{11}$ or n-$C_6H_{11}$;

The medium comprises further compounds, preferably selected from the following group consisting of the general formulae XIX to XXII:

in which $R^0$, $X^0$, $Y^1$, $Y^2$ and $Y^3$ are as defined above, and the 1.4-phenylene rings may be substituted by methyl, CN, chlorine or fluorine. The 1.4-phenylene rings are preferably monosubstituted or polysubstituted by fluorine atoms.

The medium preferably comprises two-ring carbocyclic compounds of the formula XXIII where

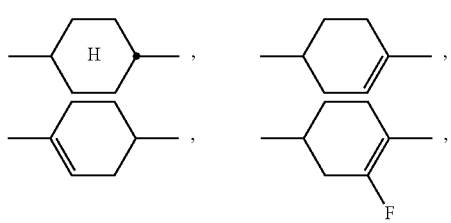

and are each, independently of one another,

-continued

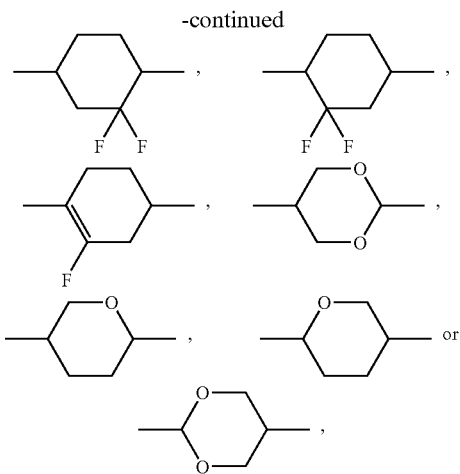

$Z^0$ is a single bond, $-C_2H_4-$, $-C_4H_8-$, $-COO-$, $-O-CO-$, $-CF_2O-$ or $-OCF_2-$, $r^0$ is 1 or 2, $R^{0'}$ is as defined for $R^0$, and $X^{0''}$ is $OCF_3$, F, Cl, $CF_3$, alkyl or alkoxy.

Preferred sub-formulae of the formula XXIII are

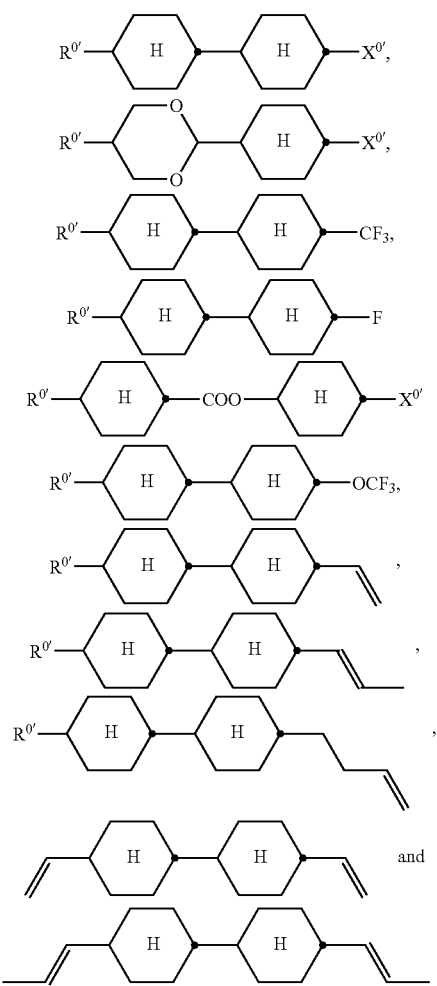

Very particularly preferred sub-formulae of the formula XXIII are

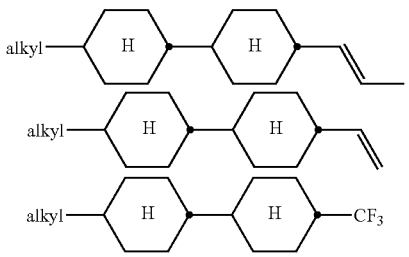

where alkyl is a straight-chain alkyl radical having 1–8 carbon atoms, in particular having 2–5 carbon atoms.

The medium preferably comprises two or three compounds of the formula XXIII.

The proportion of the compounds of the formula XXIII in the medium according to the invention is 5–40% by weight, in particular 5–35% by weight.

The I: (II+III+IV+V+VI+VII+VIII) weight ratio is preferably from 1:10 to 10:1.

The medium essentially consists of compounds selected from the group consisting of the general formulae I to XVIII.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably=1 and m is preferably from 1 to 6.

It has been found that even a relatively small proportion of compounds of the formula I mixed with conventional liquid-crystal materials, but in particular with one or more compounds of the formulae II, III, IV, V, VI, VII and/or VIII, results in a significant lowering of the threshold voltage and in low birefringence values, with broad nematic phases with low smectic-nematic transition temperatures being observed at the same time, improving the shelf life. Particular preference is given to mixtures which, besides one or more compounds of the formula I, comprise one or more compounds of the formula IV, in particular compounds of the formula IVa in which $X^0$ is F, $OCHF_2$ or $OCF_3$. The compounds of the formulae I to VIII are colourless, stable and readily miscible with one another and with other liquid-crystalline materials. Furthermore, the mixtures according to the invention are distinguished by very high clearing points, the values for the rotational viscosity $\gamma_1$ being comparatively low.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+IV+V+VI+VII+VIII depends substantially on the desired properties, on the choice of the components of the formulae I, II, III, IV, V, VI, VII and/or VIII, and the choice of any other components that may be present.

Suitable mixing ratios within the range given above can easily be determined from case to case.

The total amount of compounds of the formulae I to XVIII in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae I to XVIII.

In a particularly preferred embodiment, the media according to the invention comprise compounds of the formulae II to VIII (preferably II, III and/or IV, in particular IVa) in which $X^0$ is F, $OCF_3$, $OCHF_2$, $OCH=CF_2$, $OCF=CF_2$ or $OCF_2$—$CF_2H$. A favourable synergistic effect with the compounds of the formula I results in particularly advantageous properties. In particular, mixtures comprising compounds of the formula I and of the formula IVa are distinguished by their low threshold voltages.

The construction of the MLC display according to the invention from polarisers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and no the refractive index. $\Delta\in$ denotes the dielectric anisotropy ($\Delta\in=\in_\parallel-\in_\perp$, where $\in_\parallel$ denotes the dielectric constant parallel to the longitudinal molecular axes and $\in_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 or 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |
| V-n | CH$_2$=CH | $C_nH_{2n+1}$ | H | H |

Preferred mixture components of the mixture concept according to the invention are given in Tables A and B.

TABLE A
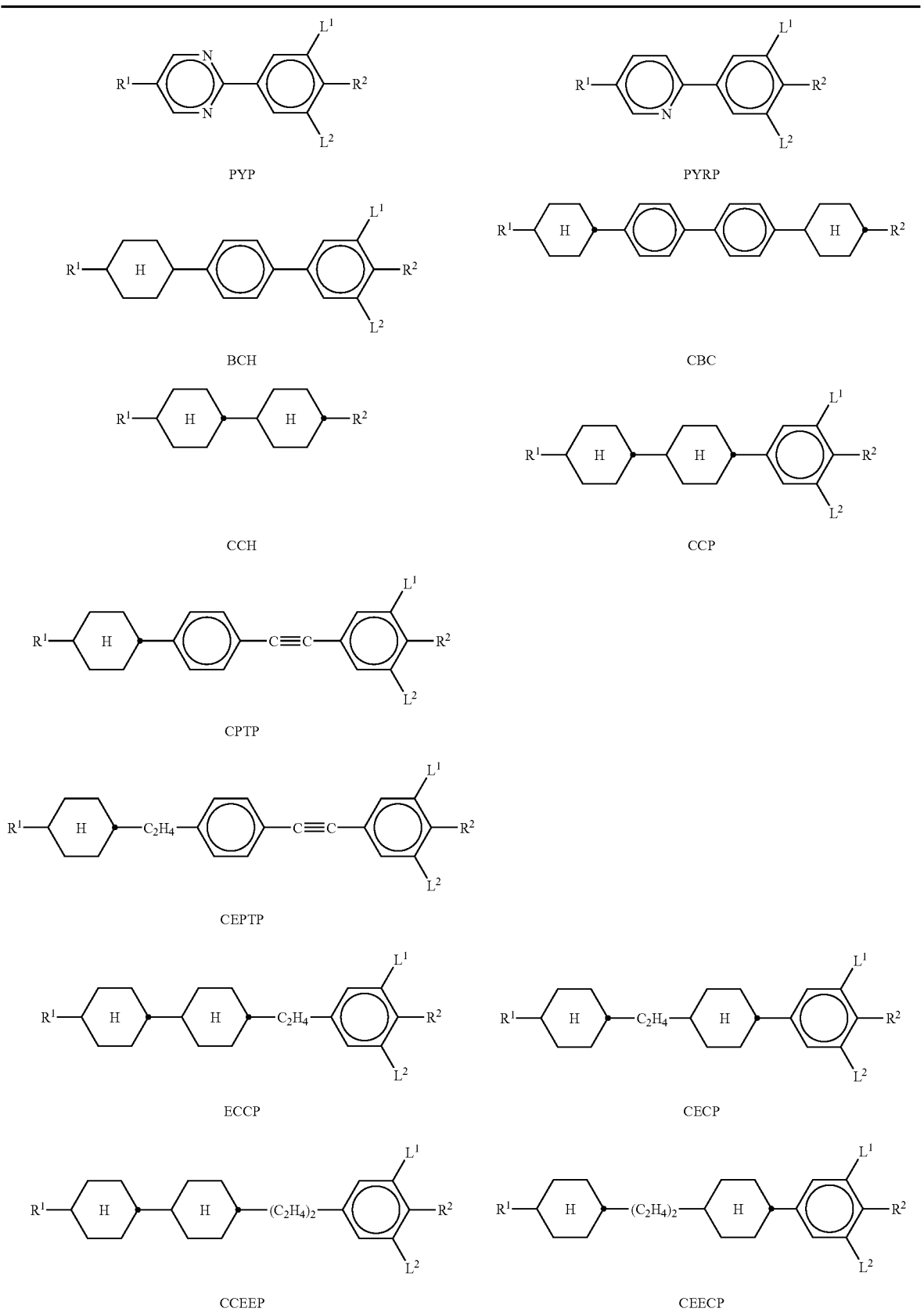

TABLE A-continued
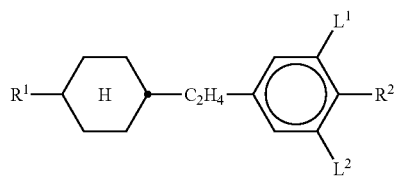
EPCH
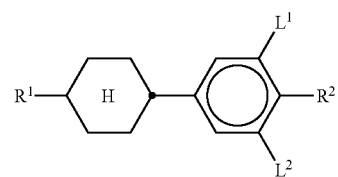
PCH
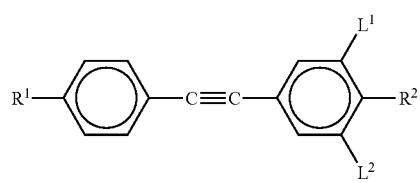
PTP
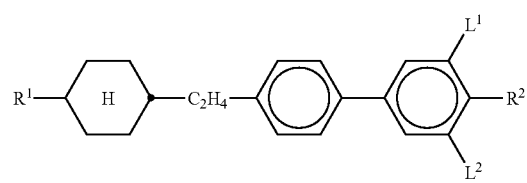
BECH
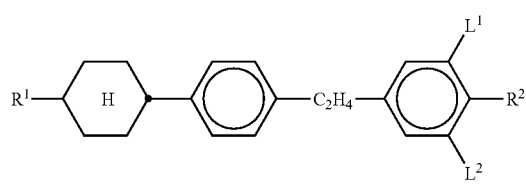
EBCH
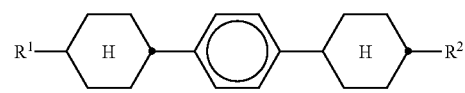
CPC
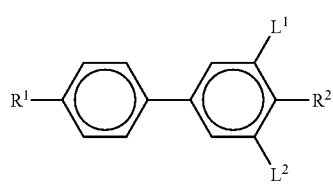
B
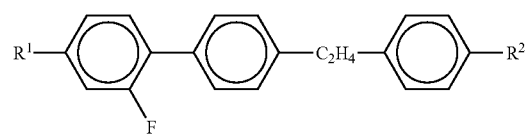
FET-nF
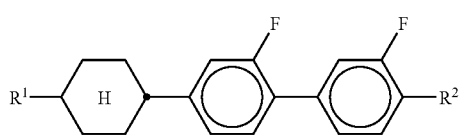
CGG
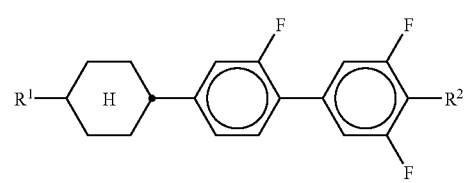
CGU
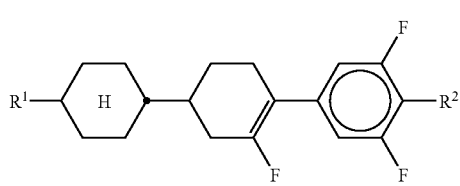
CFU TABLE B
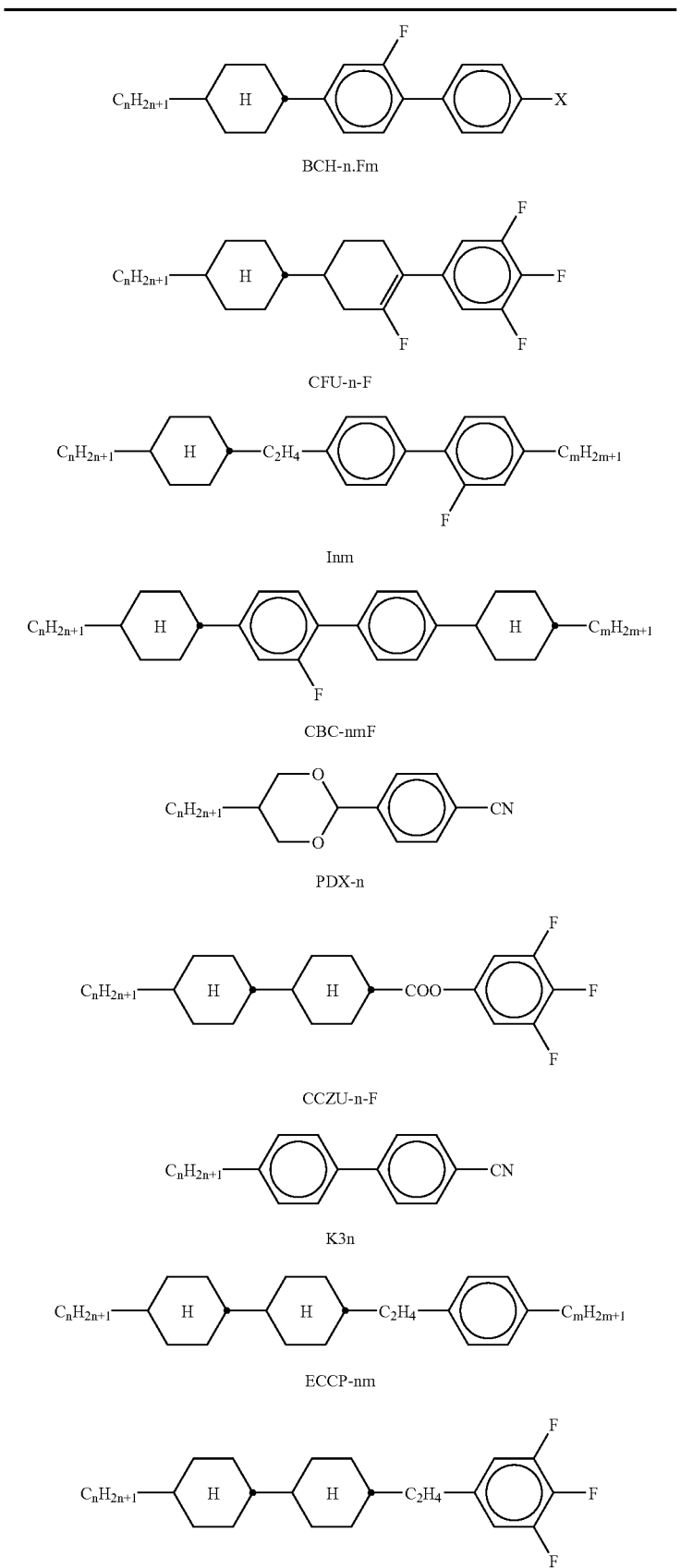

TABLE B-continued
ECCP-nF.F.F
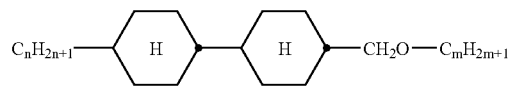
CCH-n1EM
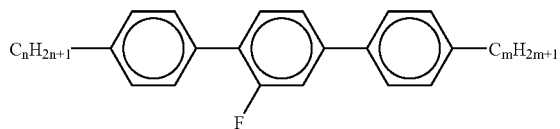
T-nFm
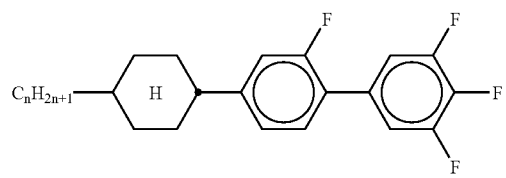
CGU-n-F
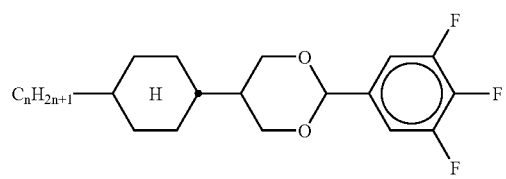
CDU-n-X
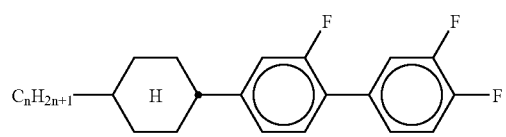
CGG-n-F
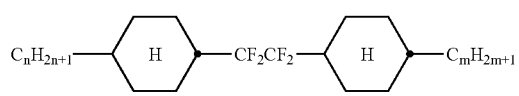
CWC-n-m
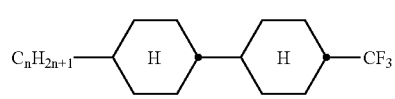
CCH-nCF₃
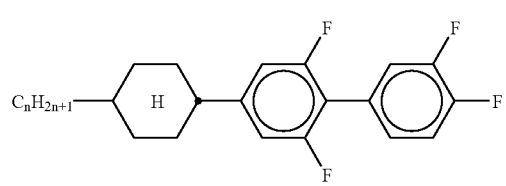
CUP-nF.F
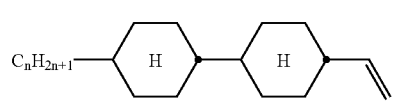

TABLE B-continued
CC-n-V
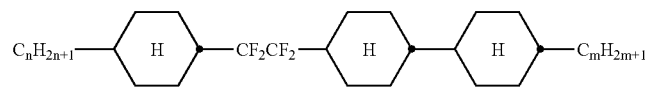
CWCC-n-m
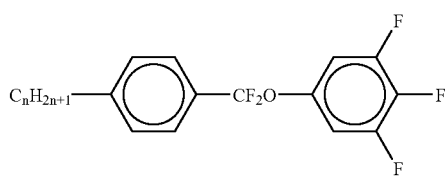
PQU-n-F
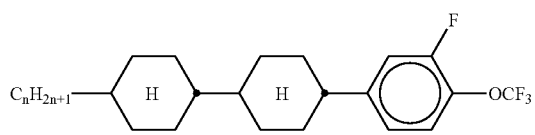
CCG-n-OT
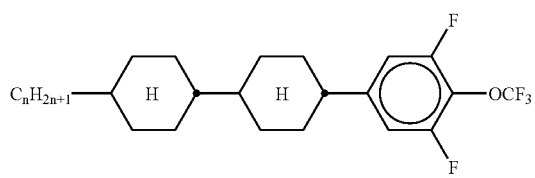
CCU-n-OT
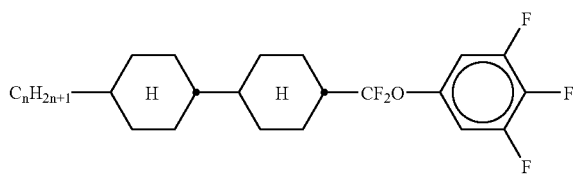
CCQU-n-F
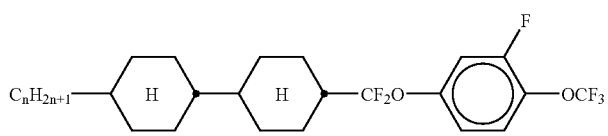
CCQG-n-OT
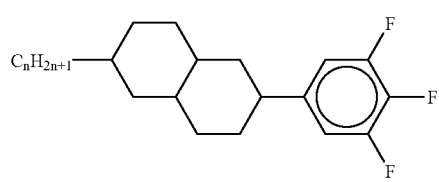
Dec-U-n-F TABLE B-continued
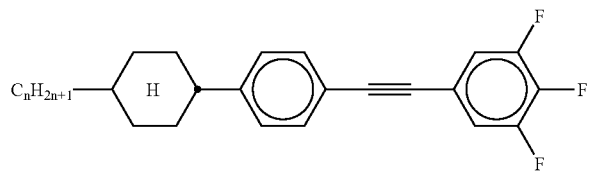
CPTU-n-F
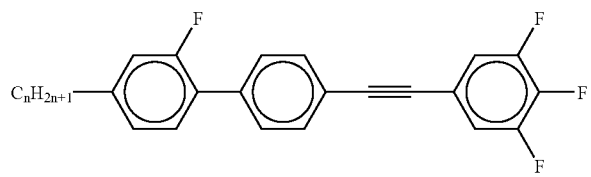
GPTU-n-F
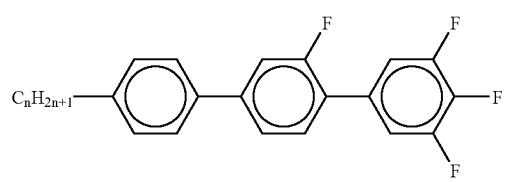
PGU-n-F
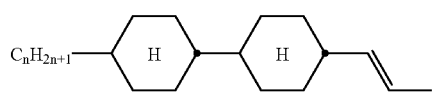
CC-n-V1
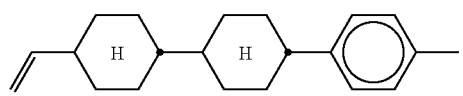
CCP-V-1
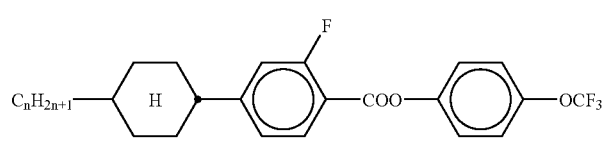
CGZP-n-OT
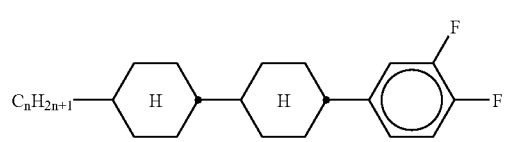
CCP-nF.F
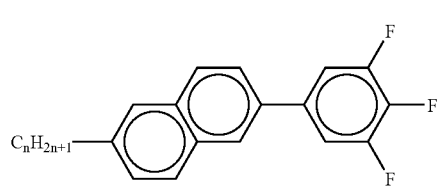
Nap-U-n-F TABLE B-continued
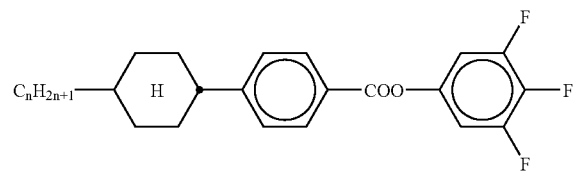
CPZU-n-F
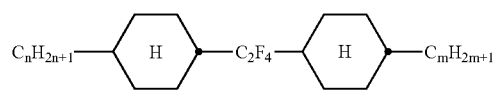
CWC-n-m
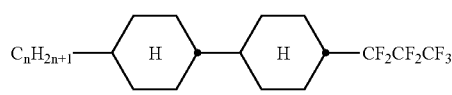
CC-n-DDT
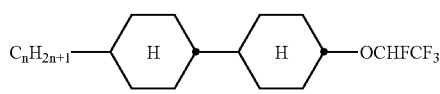
CC-n-OMT
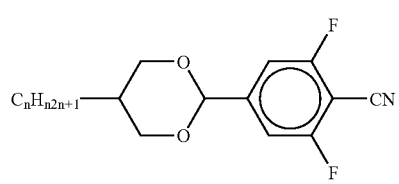
DU-n-N
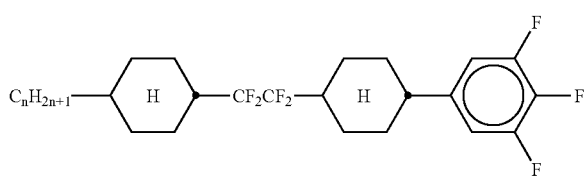
CWCU-n-F
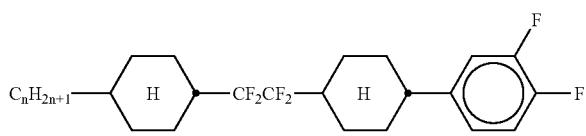
CWCG-n-F
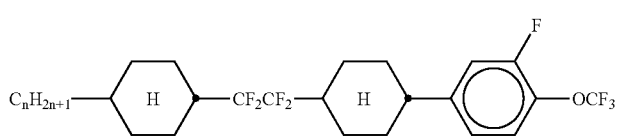
CWCG-n-OT
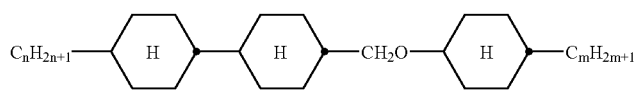
CCOC-n-m TABLE B-continued
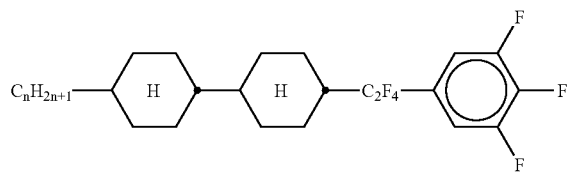
CCWU-n-F
TABLE C
Table C shows possible dopants which are generally added to the compounds according to the invention.
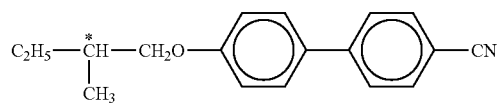
C 15
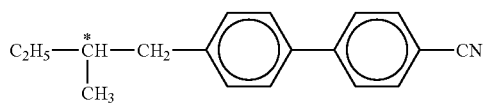
CB 15
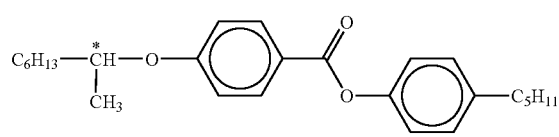
CM 21
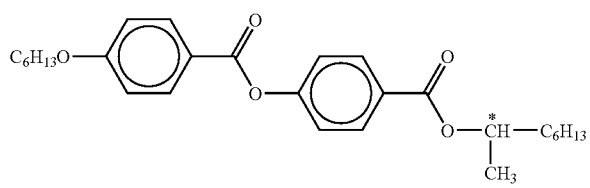
R/S-811
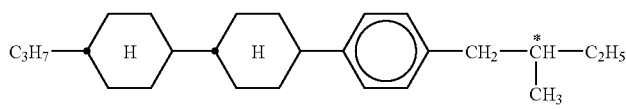
CM 44
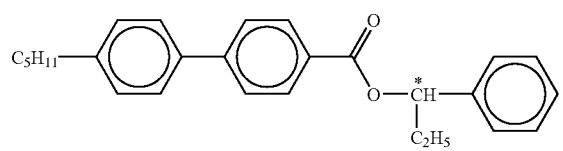
CM 45

TABLE C-continued
Table C shows possible dopants which are generally added to the
compounds according to the invention.
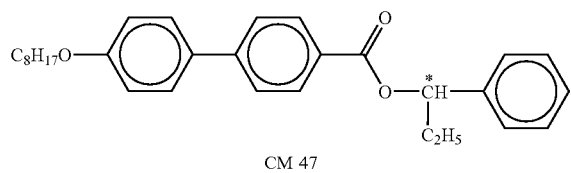
CM 47
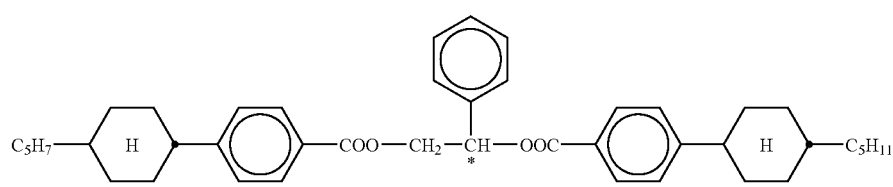
R/S-1011
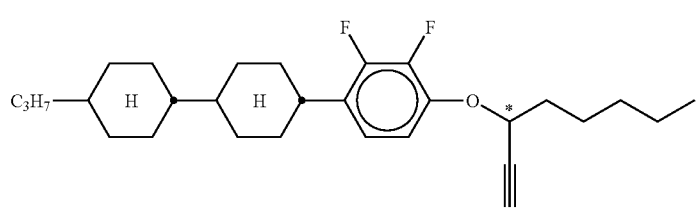
R/S-3011
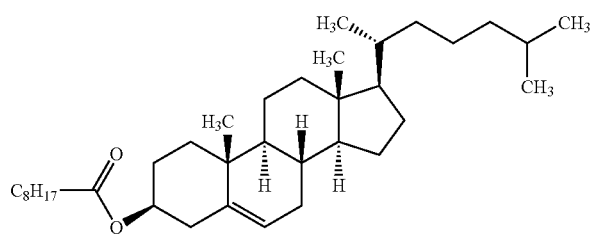
CN
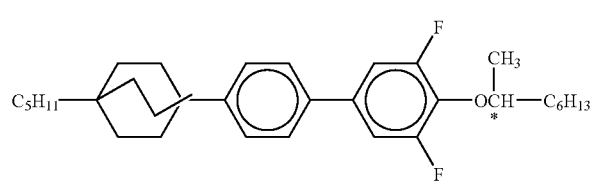
R/S-8950
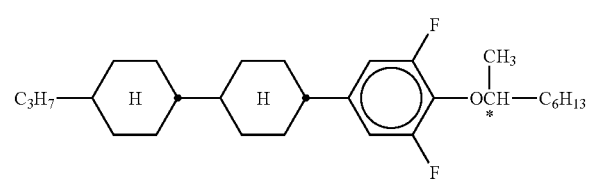
R/S-2011

Besides one or more compounds of the formula I, particularly preferred mixtures comprise one, two, three, four, five or more compounds from Table B.

The following examples are intended to explain the invention without restricting it. Above and below, percentages are percent by weight. All temperatures are given in degrees Celsius. m.p. denotes melting point, cl.p. =clearing point. Furthermore, C=crystalline state, N=nematic phase, S=smectic phase and I=isotropic phase. The data between these symbols represent the transition temperatures. An denotes optical anisotropy (589 nm, 20° C.). The flow viscosity $\nu_{20}$ (mm²/sec) and the rotational viscosity $\gamma_1$ [mPa·s] were each determined at 20° C.

MIXTURE EXAMPLES

Example M1

| | | | |
|---|---|---|---|
| PCH-7-F | 4.00% | S → N [° C.]: | <−40 |
| CC-5-V | 12.00% | Clearing point [° C.]: | 92.5 |
| CCP-2F.F.F | 12.00% | Δn [589 nm, 20° C.]: | +0.0864 |
| CCP-3F.F.F | 11.00% | $\gamma_1$ [mPa · s, 20° C.]: | 130 |
| CCP-5F.F.F | 7.00% | $V_{10}$ [V]: | 1.76 |
| CWCG-3-F | 8.00% | d · Δn [μm, 20° C.]: | 0.50 |
| CCP-20CF$_3$ | 8.00% | Twist [°]: | 90 |
| CCP-30CF$_3$ | 8.00% | | |
| CCP-40CF$_3$ | 6.00% | | |
| CCP-50CF$_3$ | 8.00% | | |
| BCH-2F.F | 8.00% | | |
| BCH-3F.F | 8.00% | | |

Example M2

| | | | |
|---|---|---|---|
| CCH-3CF$_3$ | 8.00% | S → N [° C.]: | <−40 |
| CCH-5CF$_3$ | 8.00% | Clearing point [° C.]: | 83.5 |
| CCP-2F.F.F | 11.00% | Δn [589 nm, 20° C.]: | +0.0702 |
| CCP-3F.F.F | 12.00% | $\gamma_1$ [mPa · s, 20° C.]: | 138 |
| CCP-5F.F.F | 5.00% | Twist [°]: | 90 |
| CCZU-2-F | 4.00% | $V_{10}$ [V]: | 1.37 |
| CCZU-3-F | 15.00% | d · Δn [μm, 20° C.]: | 0.50 |
| CCZU-5-F | 4.00% | | |
| CCP-20CF$_3$.F | 7.00% | | |
| CCP-30CF$_3$.F | 7.00% | | |
| CCP-50CF$_3$.F | 3.00% | | |
| CWCU-3-F | 16.00% | | |

Example M 3

| | | | |
|---|---|---|---|
| BCH-3F.F | 10.80% | Clearing point [° C.]: | 98.5 |
| BCH-5F.F | 9.00% | Δn [589 nm, 20° C.]: | +0.0960 |
| ECCP-30CF$_3$ | 4.50% | Δε [1 KHz, 20° C.]: | +5.4 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CWCG-3-F | 9.97% | | |

Example M 4

| | |
|---|---|
| BCH-3F.F | 10.80% |
| BCH-5F.F | 9.00% |
| ECCP-30CF$_3$ | 4.50% |
| ECCP-50CF$_3$ | 4.50% |
| CBC-33F | 1.80% |
| CBC-53F | 1.80% |
| CBC-55F | 1.80% |
| PCH-6F | 7.20% |
| PCH-7F | 5.40% |
| CCP-20CF$_3$ | 7.20% |
| CCP-30CF$_3$ | 10.80% |
| CCP-40CF$_3$ | 6.30% |
| CCP-50CF$_3$ | 9.90% |
| PCH-5F | 9.00% |
| CWCG-3-F | 10.02% |

Example M 5

| | |
|---|---|
| BCH-3F.F | 9.60% |
| BCH-5F.F | 8.00% |
| ECCP-30CF$_3$ | 4.00% |
| ECCP-50CF$_3$ | 4.00% |
| CBC-33F | 1.60% |
| CBC-53F | 1.60% |
| CBC-55F | 1.60% |
| PCH-6F | 6.40% |
| PCH-7F | 4.80% |
| CCP-20CF$_3$ | 6.40% |
| CCP-30CF$_3$ | 9.60% |
| CCP-40CF$_3$ | 5.60% |
| CCP-50CF$_3$ | 8.80% |
| PCH-5F | 8.00% |
| CWCG-3-F | 19.97% |

Example M 6

| | |
|---|---|
| CCH-301 | 13.00% |
| CCH-501 | 15.00% |
| CCP-2F.F.F | 8.00% |
| CCP-3F.F.F | 0.00% |
| CCZU-2-F | 4.00% |
| CCZU-3-F | 13.00% |
| CCZU-5-F | 4.00% |
| CCOC-3-3 | 3.00% |
| CCOC-4-3 | 4.00% |
| CCOC-3-5 | 2.00% |
| CH-35 | 2.00% |
| CH-43 | 3.00% |
| CH-45 | 3.00% |
| CWC-5-3 | 5.00% |
| CWCU-3-F | 15.00% |

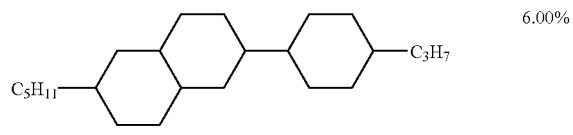

6.00%

Example M 7

| | |
|---|---|
| CCH-301 | 14.00% |
| CCH-501 | 13.00% |
| CCP-2F.F.F | 5.00% |
| CCZU-2-F | 4.00% |
| CCZU-3-F | 8.00% |
| CCZU-5-F | 4.00% |
| CCOC-3-3 | 3.00% |
| CCOC-4-3 | 4.00% |
| CCOC-3-5 | 2.00% |
| CCPC-35 | 2.00% |
| CH-35 | 2.00% |
| CH-43 | 3.00% |
| CH-45 | 2.00% |
| CCQU-3-F | 5.00% |
| CWC-5-3 | 5.00% |
| CWCU-3-F | 8.00% |
| CECU-3-F | 5.00% |
| ECCP-3F.F.F | 5.00% |

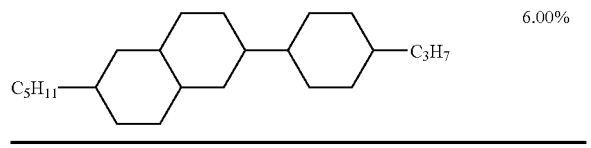

6.00%

Example M 8

| | |
|---|---|
| CCP-2F.F.F | 9.00% |
| CCP-3F.F.F | 9.00% |
| CCP-5F.F.F | 4.00% |
| CCZU-2-F | 4.00% |
| CCZU-3-F | 14.00% |
| CCZU-5-F | 4.00% |
| CCP-20CF$_3$.F | 4.00% |
| CCP-30CF$_3$.F | 4.00% |
| CCP-50CF$_3$.F | 4.00% |
| CGU-2-F | 3.00% |
| CGU-3-F | 2.00% |
| CCH-3CF$_3$ | 5.00% |
| CCH-5CF$_3$ | 5.00% |
| CCQU-2-F | 10.00% |
| CCQU-3-F | 10.00% |
| CWCU-3-F | 5.00% |

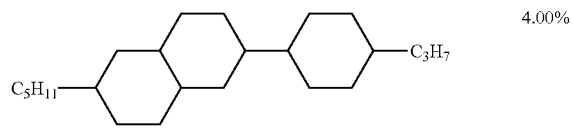

4.00%

Example 9

| | |
|---|---|
| CCP-2F.F.F | 11.00% |
| CCP-3F.F.F | 10.00% |
| CCP-5F.F.F | 4.00% |
| CCZU-2-F | 4.00% |
| CCZU-3-F | 15.00% |
| CCZU-5-F | 4.00% |
| CCP-20CF$_3$.F | 7.00% |
| CCP-30CF$_3$.F | 4.00% |
| CCP-50CF$_3$.F | 4.00% |
| CGU-2-F | 4.00% |
| CGU-3-F | 3.00% |
| CCH-3CF$_3$ | 7.00% |
| CCH-5CF$_3$ | 6.00% |
| CWCU-3-F | 12.00% |

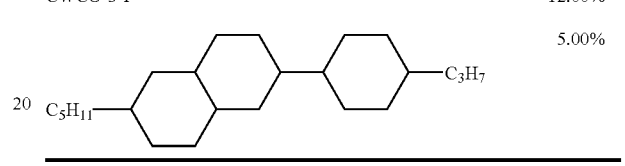

5.00%

Example M 10

| | |
|---|---|
| CCP-2F.F.F | 11.00% |
| CCP-3F.F.F | 10.00% |
| CCP-5F.F.F | 4.00% |
| CCZU-2-F | 4.00% |
| CCZU-3-F | 15.00% |
| CCZU-5-F | 4.00% |
| CGU-2-F | 3.00% |
| CGU-3-F | 3.00% |
| CCH-3CF$_3$ | 5.00% |
| CCH-5CF$_3$ | 5.00% |
| CWCU-3-F | 12.00% |
| CECU-3-F | 5.00% |
| ECCP-2F.F.F | 4.00% |
| ECCP-3F.F.F | 5.00% |
| ECCP-5F.F.F | 5.00% |

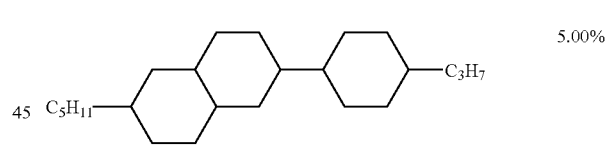

5.00%

Example M 11

| | | | |
|---|---|---|---|
| BCH-3F.F | 10.80% | $\gamma_1$ [mPa · s, 20° C.]: | 145 |
| BCH-5F.F | 9.00% | | |
| ECCP-30CF$_3$ | 4.50% | | |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CWCU-3-F | 10.02% | | |

Example M 12

| | |
|---|---|
| CCH-301 | 11.20% |
| CCH-501 | 8.80% |
| CCP-2F.F.F | 8.00% |
| CCP-3F.F.F | 10.40% |
| CCP-5F.F.F | 4.00% |
| CCZU-2-F | 4.00% |
| CCZU-3-F | 13.60% |
| CCZU-5-F | 4.00% |
| CH-33 | 2.40% |
| CH-35 | 2.40% |
| CH-43 | 2.40% |
| CCPC-33 | 2.40% |
| CCH-3CF$_3$ | 6.40% |
| CWCU-3-F | 19.98% |

Example M 13

| | |
|---|---|
| CCH-3CF$_3$ | 8.00% |
| CCH-5CF$_3$ | 7.00% |
| CCP-2F.F.F | 11.00% |
| CCP-3F.F.F | 12.00% |
| CCP-5F.F.F | 5.00% |
| CCZU-2-F | 4.00% |
| CCZU-3-F | 15.00% |
| CCZU-5-F | 4.00% |
| CCP-2OCF$_3$.F | 7.00% |
| CCP-3OCF$_3$.F | 3.00% |
| CGU-2-F | 4.00% |
| CWCU-3-F | 20.00% |

Example M 14

| | |
|---|---|
| CCH-301 | 14.00% |
| CCH-501 | 16.00% |
| CCP-2F.F.F | 5.00% |
| CCZU-2-F | 4.00% |
| CCZU-3-F | 13.00% |
| CCZU-5-F | 4.00% |
| CCOC-3-3 | 3.00% |
| CCOC-4-3 | 4.00% |
| CCOC-3-5 | 2.00% |
| CCPC-35 | 3.00% |
| CH-35 | 2.00% |
| CH-43 | 2.00% |
| CH-45 | 2.00% |
| CCQU-2-F | 5.00% |
| CCQU-3-F | 5.00% |
| CWC-5-3 | 5.00% |
| | 5.00% |

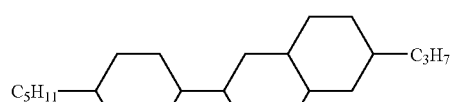

Example M 15

| | |
|---|---|
| CCP-2F.F.F | 11.00% |
| CCP-3F.F.F | 11.00% |
| CCP-5F.F.F | 6.00% |
| CCP-2OCF$_3$.F | 8.00% |
| CCP-5OCF$_3$.F | 6.00% |
| CGU-2-F | 5.00% |
| CGU-3-F | 4.00% |
| CCOC-3-3 | 2.00% |
| CCOC-4-3 | 3.00% |
| CC-5-V | 7.00% |
| CC-2-DDT | 8.00% |
| CC-3-DDT | 8.00% |
| CWCU-3-F | 21.00% |

Example M 16

| | |
|---|---|
| CCP-2F.F.F | 11.00% |
| CCP-3F.F.F | 11.00% |
| CCP-5F.F.F | 6.00% |
| CCP-2OCF$_3$.F | 9.00% |
| CCP-5OCF$_3$.F | 7.00% |
| CGU-2-F | 7.00% |
| CGU-3-F | 3.00% |
| CCOC-3-3 | 2.00% |
| CCOC-4-3 | 2.00% |
| CC-5-V | 10.00% |
| CWCU-3-F | 18.00% |
| | 14.00% |

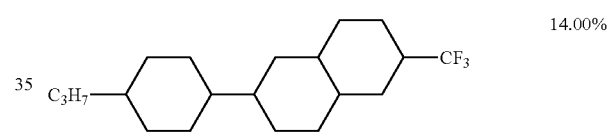

Example M 17

| | |
|---|---|
| CCP-2F.F.F | 11.00% |
| CCP-3F.F.F | 11.00% |
| CCP-5F.F.F | 6.00% |
| CCP-2OCF$_3$.F | 6.00% |
| CCP-3OCF$_3$.F | 6.00% |
| CCP-5OCF$_3$.F | 6.00% |
| CGU-2-F | 10.00% |
| CGU-3-F | 10.00% |
| CCOC-3-3 | 3.00% |
| CCOC-4-3 | 4.00% |
| CCOC-3-5 | 3.00% |
| CC-3-OMT | 3.00% |
| CC-5-OMT | 4.00% |
| CWCU-3-F | 17.00% |

Example M 18

| | |
|---|---|
| CCP-2F.F.F | 11.00% |
| CCP-3F.F.F | 11.00% |
| CCP-5F.F.F | 6.00% |
| CCP-2OCF$_3$.F | 6.00% |
| CCP-3OCF$_3$.F | 4.00% |

-continued

| | |
|---|---|
| CCP-50CF$_3$.F | 8.00% |
| CGU-2-F | 12.00% |
| CGU-3-F | 8.00% |
| CCOC-3-3 | 3.00% |
| CCOC-4-3 | 3.00% |
| CCOC-3-5 | 3.00% |
| CWCU-3-F | 18.00% |
| CC-2-DDT | 3.00% |
| CC-3-DDT | 4.00% |

Example M 19

| | |
|---|---|
| CCP-2F.F.F | 11.00% |
| CCP-3F.F.F | 11.00% |
| CCP-5F.F.F | 6.00% |
| CCP-20CF$_3$.F | 9.00% |
| CCP-50CF$_3$.F | 9.00% |
| CGU-2-F | 10.00% |
| CGU-3-F | 11.00% |
| CCOC-3-3 | 3.00% |
| CCOC-4-3 | 3.00% |
| CCOC-3-5 | 2.00% |
| CWCU-3-F | 18.00% |
| 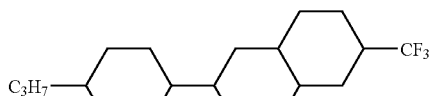 | 7.00% |

Example M 20

| | |
|---|---|
| CCP-2F.F.F | 12.00% |
| CCP-3F.F.F | 11.00% |
| CCP-5F.F.F | 6.00% |
| CCP-20CF$_3$.F | 10.00% |
| CCP-50CF$_3$.F | 9.00% |
| CGU-2-F | 4.00% |
| CGU-3-F | 4.00% |
| CCOC-3-3 | 2.00% |
| CCOC-4-3 | 3.00% |
| CCH-3CF$_3$ | 8.00% |
| CCH-5CF$_3$ | 8.00% |
| CCC-3-DDT | 5.00% |
| CWCU-3-F | 18.00% |

Example M 21

| | |
|---|---|
| CCP-2F.F.F | 11.00% |
| CCP-3F.F.F | 11.00% |
| CCP-5F.F.F | 6.00% |
| CCP-20CF$_3$.F | 11.00% |
| CCP-50CF$_3$.F | 8.00% |
| CGU-2-F | 11.00% |
| CGU-3-F | 8.00% |
| CC-5-V | 10.00% |
| CCC-3-DDT | 5.00% |
| CWCU-3-F | 19.00% |

Example M 22

| | | | |
|---|---|---|---|
| PCH-5F | 3.20% | Δε [1 kHz, 20° C.]: | +8.5 |
| CCP-20CF$_2$.F.F | 17.06% | V$_0$ [V]: | 1.34 |
| CCP-30CF$_2$.F.F | 16.02% | | |
| CCP-50CF$_2$.F.F | 17.06% | | |
| CUP-2F.F | 5.37% | | |
| CUP-3F.F | 5.37% | | |
| CBC-33F | 5.37% | | |
| CBC-53F | 5.37% | | |
| CBC-55F | 5.29% | | |
| CWCU-3-F | 19.91% | | |

Example M 23

| | | | |
|---|---|---|---|
| BCH-3F.F | 10.47% | Δn [589 nm, 20° C.]: | +0.0933 |
| BCH-5F.F | 8.95% | Δε [1 kHz, 20° C.]: | +5.7 |
| ECCP-30CF$_3$ | 4.47% | | |
| ECCP-50CF$_3$ | 4.47% | | |
| CBC-33F | 1.79% | | |
| CBC-53F | 1.79% | | |
| CBC-55F | 1.79% | | |
| PCH-6F | 7.16% | | |
| PCH-7F | 5.37% | | |
| CCP-20CF$_3$ | 7.16% | | |
| CCP-30CF$_3$ | 10.74% | | |
| CCP-40CF$_3$ | 6.26% | | |
| CCP-50CF$_3$ | 9.84% | | |
| PCH-5F | 8.95% | | |
| CWCU-3-F | 10.51% | | |

Example M 24

| | |
|---|---|
| BCH-3F.F | 10.81% |
| BCH-5F.F | 9.01% |
| ECCP-30CF$_3$ | 4.50% |
| ECCP-50CF$_3$ | 4.50% |
| CBC-33F | 1.80% |
| CBC-53F | 1.80% |
| CBC-55F | 1.80% |
| PCH-6F | 7.20% |
| PCH-7F | 5.40% |
| CCP-20CF$_3$ | 7.20% |
| CCP-30CF$_3$ | 10.81% |
| CCP-40CF$_3$ | 6.30% |
| CCP-50CF$_3$ | 9.91% |
| PCH-5F | 9.01% |
| CWCU-3-F | 9.95% |

Example M 25

| | |
|---|---|
| CCH-34 | 6.00% |
| CC-5-V | 6.00% |
| CCH-3CF$_3$ | 4.00% |
| CCH-5CF$_3$ | 7.50% |
| CCP-2F.F.F | 12.00% |
| CCP-3F.F.F | 10.00% |
| CCP-5F.F.F | 5.00% |
| CCZU-2-F | 5.00% |
| CCZU-3-F | 15.00% |

-continued

| | |
|---|---|
| CCZU-5-F | 6.00% |
| CCP-20CF₃.F | 8.50% |
| CWCU-3-F | 15.00% |

Example M 26

| | |
|---|---|
| CCH-35 | 5.00% |
| CCOC-4-3 | 3.00% |
| CCH-3CF₃ | 8.00% |
| CCH-5CF₃ | 8.00% |
| CCP-2F.F.F | 11.00% |
| CCP-3F.F.F | 11.00% |
| CCP-5F.F.F | 6.00% |
| CCZU-2-F | 5.00% |
| CCZU-3-F | 15.00% |
| CCZU-5-F | 5.00% |
| CCP-20CF₃.F | 3.00% |
| CWCU-3-F | 20.00% |

Example M 27

| | |
|---|---|
| CCH-301 | 11.20% |
| CCH-501 | 8.80% |
| CCP-2F.F.F | 8.00% |
| CCP-3F.F.F | 10.40% |
| CCP-5F.F.F | 4.00% |
| CCZU-2-F | 4.00% |
| CCZU-3-F | 13.60% |
| CCZU-5-F | 4.00% |
| CH-33 | 2.40% |
| CH-35 | 2.40% |
| CH-43 | 2.40% |
| CCPC-33 | 2.40% |
| CCH-3CF₃ | 6.40% |
| CWCG-3-OT | 20.00% |

Example M 28

| | |
|---|---|
| CCH-301 | 9.61% |
| CCH-3CF₃ | 5.49% |
| CCH-501 | 7.55% |
| CCP-2F.F.F | 6.87% |
| CCP-3F.F.F | 8.93% |
| CCP-5F.F.F | 3.43% |
| CCPC-33 | 2.06% |
| CCZU-2-F | 3.43% |
| CCZU-3-F | 11.67% |
| CCZU-5-F | 3.43% |
| CH-33 | 2.06% |
| CH-35 | 2.06% |
| CH-43 | 2.06% |
| CWCG-3-OT | 31.34% |

Example M 29

| | |
|---|---|
| PCH-5F | 3.22% |
| CCP-20CF₂.F.F | 17.17% |
| CCP-30CF₂.F.F | 16.12% |
| CCP-50CF₂.F.F | 17.17% |
| CUP-2F.F | 5.40% |
| CUP-3F.F | 5.40% |
| CBC-33F | 5.40% |
| CBC-53F | 5.40% |
| CBC-55F | 5.32% |
| CWCG-3-OT | 19.38% |

Example M 30

| | |
|---|---|
| BCH-3F.F | 10.91% |
| BCH-5F.F | 9.09% |
| ECCP-30CF₃ | 4.55% |
| ECCP-50CF₃ | 4.55% |
| CBC-33F | 1.82% |
| CBC-53F | 1.82% |
| CBC-55F | 1.82% |
| PCH-6F | 7.27% |
| PCH-7F | 5.45% |
| CCP-20CF₃ | 7.27% |
| CCP-30CF₃ | 10.91% |
| CCP-40CF₃ | 6.36% |
| CCP-50CF₃ | 10.00% |
| PCH-5F | 9.09% |
| CWCG-3-OT | 9.09% |

Example M 31

| | |
|---|---|
| CCH-3CF₃ | 8.00% |
| CCH-5CF₃ | 8.00% |
| CCP-2F.F.F | 11.00% |
| CCP-3F.F.F | 12.00% |
| CCP-5F.F.F | 5.00% |
| CCZU-2-F | 4.00% |
| CCZU-3-F | 15.00% |
| CCZU-5-F | 4.00% |
| CCP-20CF₃.F | 12.00% |
| CCP-30CF₃-F | 8.00% |
| CCP-50CF₃.F | 3.00% |
| CWCG-3-OT | 10.00% |

Example M 32

| | | | |
|---|---|---|---|
| CCH-301 | 4.00% | Clearing point [° C.]: | +87.0 |
| CCH-501 | 5.00% | Δn [589 nm, 20° C.]: | +0.0678 |
| CCP-2F.F.F | 12.00% | d · Δn [μm, 20° C.]: | 0.50 |
| CCP-3F.F.F | 11.00% | V₁₀ [V]: | 1.46 |
| CCP-5F.F.F | 6.00% | | |
| CCZU-2-F | 5.00% | | |
| CCZU-3-F | 15.00% | | |
| CCZU-5-F | 4.00% | | |
| CGU-2-F | 2.00% | | |
| CGU-3-F | 2.00% | | |
| CCOC-3-3 | 3.00% | | |
| CCOC-3-5 | 3.00% | | |

-continued

| | |
|---|---|
| CCOC-4-3 | 4.00% |
| CCH-3CF$_3$ | 4.00% |
| CCH-5CF$_3$ | 5.00% |
| CWCU-3-F | 15.00% |

Example M 33

| | |
|---|---|
| CC-5-V | 12.00% |
| CCP-2F.F.F | 11.00% |
| CCP-3F.F.F | 11.00% |
| CCP-5F.F.F | 6.00% |
| CCZU-2-F | 5.00% |
| CCZU-3-F | 15.00% |
| CCZU-5-F | 4.00% |
| CGU-2-F | 2.00% |
| CGU-3-F | 2.00% |
| CCOC-3-3 | 3.00% |
| CCOC-3-5 | 2.00% |
| CCOC-4-3 | 3.00% |
| CCH-3CF$_3$ | 4.00% |
| CCH-5CF$_3$ | 4.00% |
| CWCU-3-F | 16.00% |

Example M 34

| | |
|---|---|
| CCP-2F.F.F | 13.00% |
| CCP-3F.F.F | 11.00% |
| CCP-5F.F.F | 6.00% |
| CWCU-3-F | 18.00% |
| CCP-20CF$_3$.F | 9.00% |
| CCP-30CF$_3$.F | 5.00% |
| CGU-2-F | 5.00% |
| CGU-3-F | 4.00% |
| CCOC-3-3 | 2.00% |
| CCOC-4-3 | 3.00% |
| CCOC-3-5 | 2.00% |
| CC-5-V | 7.00% |
| CC-2-DDT | 7.00% |
| CC-3-DDT | 8.00% |

Example M 35

| | |
|---|---|
| CCP-2F.F.F | 11.00% |
| CCP-3F.F.F | 11.00% |
| CCP-5F.F.F | 6.00% |
| CWCU-3-F | 15.00% |
| CCP-20CF$_3$ | 5.00% |
| CCP-30CF$_3$ | 6.00% |
| CCP-50CF$_3$ | 6.00% |
| CGU-2-F | 10.00% |
| CGU-3-F | 9.00% |
| CCOC-3-3 | 2.00% |
| CCOC-4-3 | 3.00% |
| CCOC-3-5 | 1.00% |
| CC-5-V | 3.00% |
| CC-2-DDT | 4.00% |
| CC-3-DDT | 8.00% |

Example M 36

| | |
|---|---|
| CCP-2F.F.F | 13.00% |
| CCP-3F.F.F | 11.00% |
| CCP-5F.F.F | 6.00% |
| CWCU-3-F | 18.00% |
| CCP-20CF$_3$.F | 8.00% |
| CCP-30CF$_3$.F | 7.00% |
| CGU-2-F | 6.00% |
| CGU-3-F | 4.00% |
| CCOC-3-3 | 3.00% |
| CCOC-4-3 | 3.00% |
| CCOC-3-5 | 2.00% |
| CC-5-V | 6.00% |
| CC-3-OMT | 7.00% |
| CC-5-OMT | 6.00% |

Example M 37

| | |
|---|---|
| CCP-2F.F.F | 11.00% |
| CCP-3F.F.F | 11.00% |
| CCP-5F.F.F | 6.00% |
| CWCU-3-F | 16.00% |
| CCP-20CF$_3$ | 7.00% |
| CCP-30CF$_3$ | 6.00% |
| CCP-50CF$_3$ | 6.00% |
| CGU-2-F | 9.00% |
| CGU-3-F | 11.00% |
| CCOC-3-3 | 2.00% |
| CCOC-4-3 | 2.00% |
| CCOC-3-5 | 2.00% |
| CC-3-OMT | 6.00% |
| CC-5-OMT | 5.00% |

Example M 38

| | |
|---|---|
| CCP-2F.F.F | 13.00% |
| CCP-3F.F.F | 11.00% |
| CCP-5F.F.F | 6.00% |
| CWCU-3-F | 20.00% |
| CCP-20CF$_3$.F | 8.00% |
| CCP-50CF$_3$.F | 6.00% |
| CGU-2-F | 6.00% |
| CGU-3-F | 5.00% |
| CCOC-3-3 | 2.00% |
| CCOC-4-3 | 2.00% |
| CC-5-V | 10.00% |

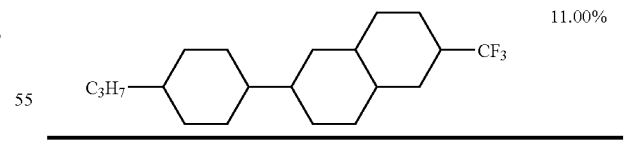

11.00%

Example M 39

| | |
|---|---|
| CCP-2F.F.F | 13.00% |
| CCP-3.F.FF | 11.00% |
| CCP-5F.F.F | 6.00% |
| CWCU-3-F | 25.00% |

-continued

| | |
|---|---|
| CCP-20CF₃.F | 7.00% |
| CCP-50CF₃.F | 3.00% |
| CGU-2-F | 6.00% |
| CGU-3-F | 4.00% |
| CC-5-V | 14.00% |
| CCC-3-DDT | 5.00% |
| CCH-3CF₃ | 3.00% |
| CCH-5CF₃ | 3.00% |

Example M 40

| | |
|---|---|
| CCH-301 | 9.45% |
| CCH-3CF₃ | 5.40% |
| CCH-501 | 7.43% |
| CCP-2F.F.F | 6.75% |
| CCP-3F.F.F | 8.78% |
| CCP-5F.F.F | 3.38% |
| CCPC-33 | 2.03% |
| CCZU-2-F | 3.38% |
| CCZU-3-F | 11.48% |
| CCZU-5-F | 3.38% |
| CH-33 | 2.03% |
| CH-35 | 2.03% |
| CH-43 | 2.03% |
| CWCU-3-F | 32.50% |

Example M 41

| | |
|---|---|
| CCP-2F.F.F | 11.00% |
| CCP-3F.F.F | 11.00% |
| CCP-5F.F.F | 6.00% |
| CCP-20CF₃.F | 8.00% |
| CCP-30CF₃.F | 4.00% |
| CCP-50CF₃.F | 8.00% |
| CGU-2-F | 5.00% |
| CGU-3-F | 3.00% |
| CCOC-3-3 | 3.00% |
| CCOC-4-3 | 4.00% |
| CCOC-3-5 | 3.00% |
| CC-5-V | 4.00% |
| CWCU-3-F | 20.00% |
| CQU-2-F | 5.00% |
| CQU-3-F | 5.00% |

Example M 42

| | |
|---|---|
| CCP-2F.F.F | 11.00% |
| CCP-3F.F.F | 11.00% |
| CCP-5F.F.F | 6.00% |

-continued

| | |
|---|---|
| CCP-20CF₃ | 7.00% |
| CCP-30CF₃ | 6.00% |
| CCP-50CF₃ | 5.00% |
| CGU-2-F | 10.00% |
| CGU-3-F | 9.00% |
| CCOC-3-3 | 3.00% |
| CCOC-4-3 | 3.00% |
| CCOC-3-5 | 2.00% |
| CC-5-V | 3.00% |
| CWCU-3-F | 18.00% |
| CQU-3-F | 3.00% |
| CQU-5-F | 3.00% |

Example M 43

| | |
|---|---|
| CCP-2F.F.F | 11.00% |
| CCP-3F.F.F | 11.00% |
| CCP-5F.F.F | 6.00% |
| CCP-20CF₃.F | 8.00% |
| CCP-50CF₃.F | 6.00% |
| CGU-2-F | 6.00% |
| CGU-3-F | 4.00% |
| CCOC-3-3 | 3.00% |
| CCOC-4-3 | 3.00% |
| CCOC-3-5 | 3.00% |
| CC-5-V | 5.00% |
| CC-3-OMT | 8.00% |
| CC-5-OMT | 8.00% |
| CWCU-3-F | 18.00% |

Example M 44

| | | | |
|---|---|---|---|
| CCH-301 | 4.00% | Clearing point [° C.]: | 99 |
| CCH-501 | 5.00% | Δn [589 nm, 20° C.]: | 0.0719 |
| CCP-2F.F.F | 12.00% | V₁₀ [V]: | 1.67 |
| CCP-3F.F.F | 11.00% | | |
| CCP-5F.F.F | 6.00% | | |
| CCZU-2-F | 5.00% | | |
| CCZU-3-F | 15.00% | | |
| CCZU-5-F | 4.00% | | |
| CGU-2-F | 2.00% | | |
| CGU-3-F | 2.00% | | |
| CCOC-3-3 | 3.00% | | |
| CCOC-3-5 | 3.00% | | |
| CCOC-4-3 | 4.00% | | |
| CWCU-3-F | 15.00% | | |
| CCP-2F.F | 4.00% | | |
| CCP-3F.F | 5.00% | | |

Example M 45

| | | | |
|---|---|---|---|
| CCH-301 | 14.00% | Clearing point [° C.]: | 98.0 |
| CCH-501 | 16.00% | Δn [589 nm, 20° C.]: | +0.059 |
| CCP-2F.F.F | 5.00% | Δε [1 KHz, 20° C.]: | 4.7 |
| CCZU-2-F | 4.00% | γ₁ [mPa · s, 20° C.]: | 133 |
| CCZU-3-F | 13.00% | | |
| CCZU-5-F | 4.00% | | |

-continued

| | |
|---|---|
| CCOC-3-3 | 3.00% |
| CCOC-4-3 | 4.00% |
| CCOC-3-5 | 2.00% |
| CCPC-35 | 3.00% |
| CH-35 | 2.00% |
| CH-43 | 2.00% |
| CH-45 | 2.00% |
| CCQU-2-F | 5.00% |
| CCQU-3-F | 5.00% |
| CWC-5-3 | 5.00% |
| CWCU-3-F | 5.00% |
| 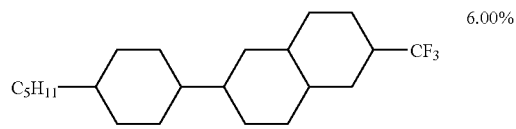 | 6.00% |

Example M 46

| | | | |
|---|---|---|---|
| CCP-2F.F.F | 13.00% | Clearing point [° C.]: | +86.5 |
| CCP-3F.F.F | 11.00% | Δn [589 nm, 20° C.]: | +0.0755 |
| CCP-5F.F.F | 6.00% | VHR (5 min; 100° C.): | 96.4% |
| CCZU-2-F | 4.00% | $V_{10}$ [V]: | 1.30 |
| CCZU-3-F | 16.00% | | |
| CCZU-5-F | 4.00% | | |
| CCP-2OCF$_3$.F | 10.00% | | |
| CCP-2OCF$_3$ | 2.00% | | |
| CGU-3-F | 3.00% | | |
| CC-5-V | 6.00% | | |
| CCOC-4-3 | 2.00% | | |
| CCWU-2-F | 2.00% | | |
| CCWU-3-F | 6.00% | | |
| CCWU-5-F | 6.00% | | |

Example M 47

| | | | |
|---|---|---|---|
| CCP-2F.F.F | 13.00% | Clearing point [° C.]: | +80.0 |
| CCP-3F.F.F | 11.00% | Δn [589 nm, 20° C.]: | +0.0809 |
| CCP-5F.F.F | 6.00% | VHR (5 min; 100° C.): | 98.8% |
| CCP-2OCF$_3$.F | 6.00% | $V_{10}$ [V]: | 1.28 |
| CCP-3OCF$_3$.F | 7.00% | | |
| CCP-5OCF$_3$.F | 6.00% | | |
| CGU-2-F | 8.00% | | |
| CGU-3-F | 12.00% | | |
| CCOC-5-3 | 2.00% | | |
| CCOC-4-3 | 2.00% | | |
| CCOC-3-5 | 2.00% | | |
| CC-5-V | 4.00% | | |
| CCWU-2-F | 7.00% | | |
| CCWU-3-F | 7.00% | | |
| CCWU-5-F | 7.00% | | |

Example M 48

| | | | |
|---|---|---|---|
| CCP-2OCF$_3$ | 6.00% | Clearing point [° C.]: | +80.5 |
| CCP-3OCF$_3$ | 8.00% | Δn [589 nm, 20° C.]: | +0.0905 |
| CCP-4OCF$_3$ | 8.00% | Δε [1 KHz, 20° C.]: | 10.7 |
| CCP-5OCF$_3$ | 6.00% | γ1 [mPa · s, 20° C.]: | 154 |
| CCP-2OCF$_3$.F | 12.00% | | |

-continued

| | |
|---|---|
| CCP-2F.F.F | 11.00% |
| CCP-3F.F.F | 13.00% |
| CGU-2-F | 10.00% |
| CGU-3-F | 10.00% |
| CGU-5-F | 9.00% |
| CCWU-3-F | 7.00% |

Example M 49

| | | | |
|---|---|---|---|
| CC-5-V | 15.00% | Clearing point [° C.]: | +110.5 |
| CCG-V-F | 13.00% | Δn [589 nm, 20° C.]: | +0.0889 |
| CCP-2OCF$_3$.F | 7.00% | Δε [1 KHz, 20° C.]: | 6.9 |
| CCP-3OCF$_3$.F | 12.00% | γ1 [mPa · s, 20° C.]: | 164 |
| CCP-2OCF$_3$ | 7.00% | | |
| CCP-3OCF$_3$ | 7.00% | | |
| CCP-4OCF$_3$ | 6.00% | | |
| CCP-5OCF$_3$ | 7.00% | | |
| CGU-3-F | 8.50% | | |
| CCGU-3-F | 4.00% | | |
| CBC-33F | 2.50% | | |
| CCWU-5-F | 5.00% | | |
| CCWU-3-F | 6.00% | | |

Example M 50

| | | | |
|---|---|---|---|
| CC-5-V | 15.00% | Clearing point [° C.]: | +109.9 |
| CCG-V-F | 15.00% | Δn [589 nm, 20° C.]: | +0.0884 |
| CCP-2OCF$_3$.F | 9.00% | Δε [1 KHz, 20° C.]: | 6.8 |
| CCP-3OCF$_3$.F | 12.00% | γ1 [mPa · s, 20° C.]: | 159 |
| CCP-2OCF$_3$ | 7.00% | | |
| CCP-3OCF$_3$ | 7.00% | | |
| CCP-4OCF$_3$ | 6.00% | | |
| CCP-5OCF$_3$ | 7.00% | | |
| PGU-3-F | 4.00% | | |
| CCGU-3-F | 4.00% | | |
| CBC-33F | 1.00% | | |
| CCWU-5-F | 7.00% | | |
| CCWU-3-F | 6.00% | | |

Example M 51

| | | | |
|---|---|---|---|
| CC-5-V | 1.00% | Clearing point [° C.]: | +111.0 |
| CCG-V-F | 8.00% | Δn [589 nm, 20° C.]: | +0.0874 |
| CCP-20CF$_3$.F | 12.00% | Δε [1 KHz, 20° C.]: | 7.0 |
| CCP-30CF$_3$.F | 12.00% | γ1 [mPa · s, 20° C.]: | 180 |
| CCP-20CF$_3$ | 7.00% | | |
| CCP-30CF$_3$ | 7.00% | | |
| CCP-40CF$_3$ | 6.00% | | |
| CCP-50CF$_3$ | 7.00% | | |
| BCH-32 | 3.50% | | |
| PCH-7F | 5.50% | | |
| ECCP-3F.F | 7.00% | | |
| CCGU-3-F | 4.00% | | |
| CCWU-5-F | 7.00% | | |
| CCWU-3-F | 7.00% | | |
| CCWU-2-F | 6.00% | | |

The invention claimed is:

1. A liquid-crystalline medium containing a mixture of polar compounds of positive or negative dielectric anisotropy, said medium comprising one or more compounds of formula I

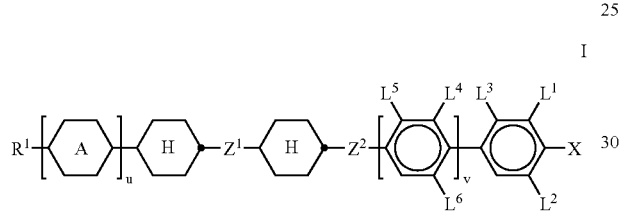
I in which
R$^1$ is an alkyl radical having from 1 to 12 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

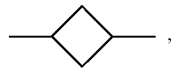

—CH=CH—, —C≡C—, —CO—, —CO—O—, —O—CO— or —O—CO—O— in such a way that O atoms are not linked directly to one another,

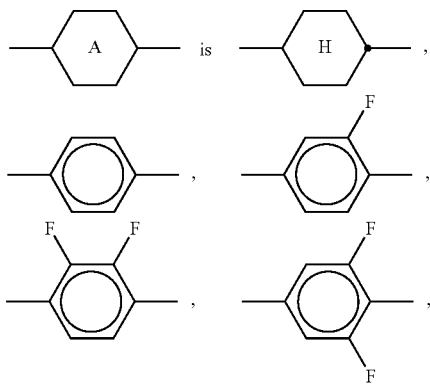

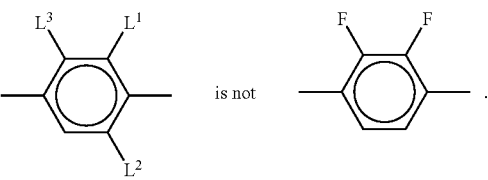

L$^{1-6}$ are each, independently of one another, H or F,

Z$^1$ and Z$^2$ are each, independently of one another, —CF$_2$CF$_2$— or a single bond, where Z$^1 \neq Z^2$, X is F, Cl, CN, OCN, NCS, SCN, an unsubstituted alkyl or alkoxy radical, a halogenated alkyl radical, a halogenated alkenyl radical, a halogenated alkoxy radical or a halogenated alkenyloxy radical having up to 6 carbon atoms, and u is 0 or 1, and v is 0 or 1, wherein

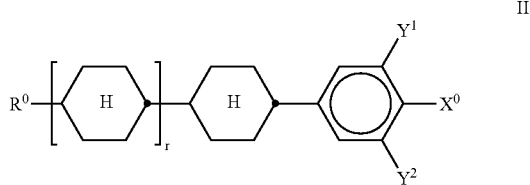

2. A medium according to claim 1, further comprising one or more additional compounds selected from formulae II, III, IV, V, VI, VII and VIII:

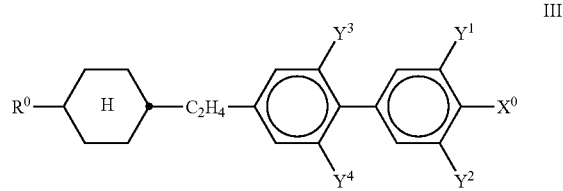
II

III

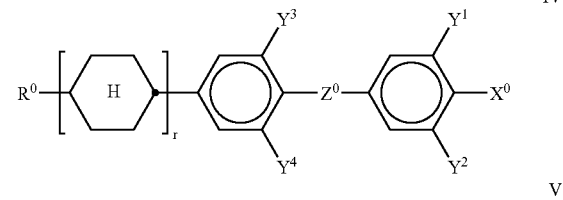
IV

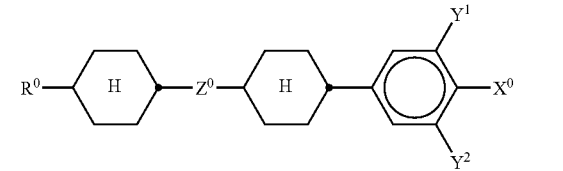
V

-continued

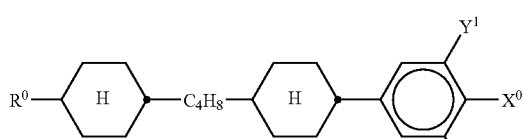

VI

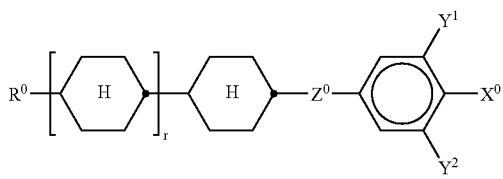

VII

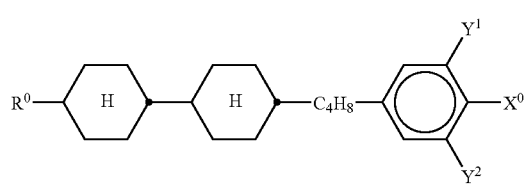

VIII wherein
- $R^0$ is n-alkyl, oxaalkyl, fluoroalkyl or alkenyl, each having up to 9 carbon atoms,
- $X^0$ is F, Cl, halogenated alkyl, alkenyl or alkoxy having from 1 to 6 carbon atoms,
- $Z^0$ is —$C_2H_4$—, —$CH_2O$—, —$OCH_2$—, —COO—, —$OCF_2$—, —$CF_2O$—, —$C_2F_4$—, —$CH_2CF_2$— or —$CF_2CH_2$—,
- $Y^1, Y^2, Y^3$ and $Y^4$ are each, independently of one another, H or F, and
- r is 0 or 1.

3. A medium according to claim 2, wherein the proportion of compounds of formulae I to VIII together in the mixture as a whole is at least 30% by weight.

4. A medium according to claim 1, wherein the proportion of compounds of formula I in the mixture as a whole is from 1 to 50% by weight.

5. A medium according to claim 2, wherein the proportion of compounds of formulae II to VIII in the mixture as a whole is from 20 to 80% by weight.

6. A medium according to claim 1, wherein said medium further comprises one or more compounds of formula IVa

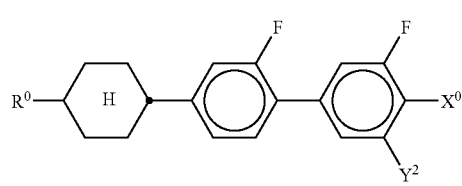

IVa wherein
- $R^0$ is n-alkyl, oxaalkyl, fluoroalkyl or alkenyl, each having up to 9 carbon atoms,
- $X^0$ is F, Cl, halogenated alkyl, alkenyl or alkoxy having from 1 to 6 carbon atoms, and
- $Y^2$ is H or F.

7. A medium according to claim 2, wherein $X^0$ is F, $OCHF_2$ or $OCF_3$, and $Y^2$ is H or F.

8. A medium according to claim 1, wherein $R^1$ is straight-chain alkyl.

9. An electro-optical liquid-crystal display containing a liquid-crystalline medium according to claim 1.

10. In a method of generating an electro-optical effect using an electro-optical display, the improvement wherein said display is according to claim 9.

11. A medium according to claim 1, wherein said medium has a nematic phase down to −20° C., a clearing points above 80° C., a dielectric anisotropy value $\Delta\varepsilon$ of $\geq 6$, and a TN threshold voltage of below 2.0 V.

12. A medium according to claim 1, wherein said medium has a nematic phase down to −40° C., a clearing points above 90° C., a dielectric anisotropy value $\Delta\varepsilon$ of $\geq 8$, and a TN threshold voltage of below 1.8 V.

13. A medium according to claim 1, wherein said medium has a flow viscosity $v_{20}$ at 20° C. of <60 mm$^2$·s$^{-1}$, and a rotational viscosity $\gamma_1$ at 20° C. of <180 mPa·s.

14. A medium according to claim 1, wherein said medium has a flow viscosity $v_{20}$ at 20° C. of <50 mm$^2$·s$^{-1}$, and a rotational viscosity $\gamma_1$ at 20° C. of <150 mPa·s.

15. A medium according to claim 1, wherein said medium comprises one or more compounds of the following formulae:

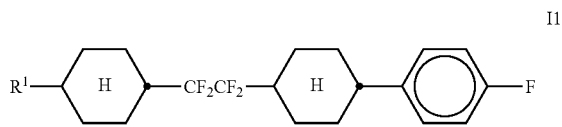

I1

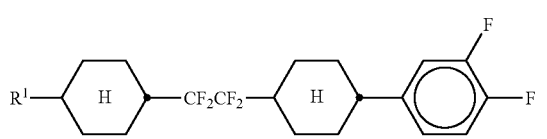

I2

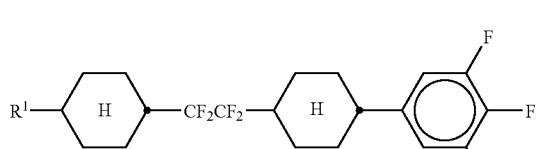

I3

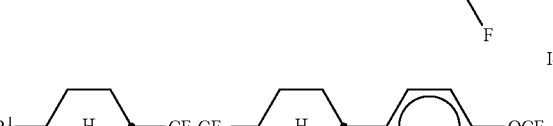

I4

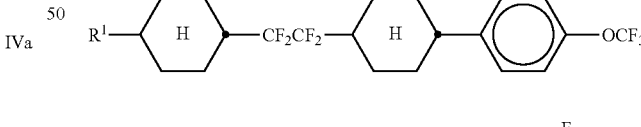

I5

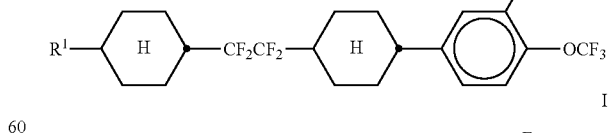

I6

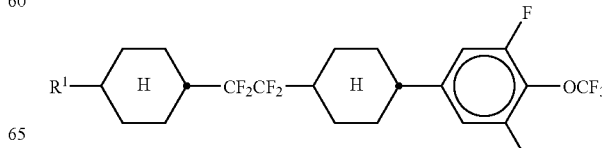

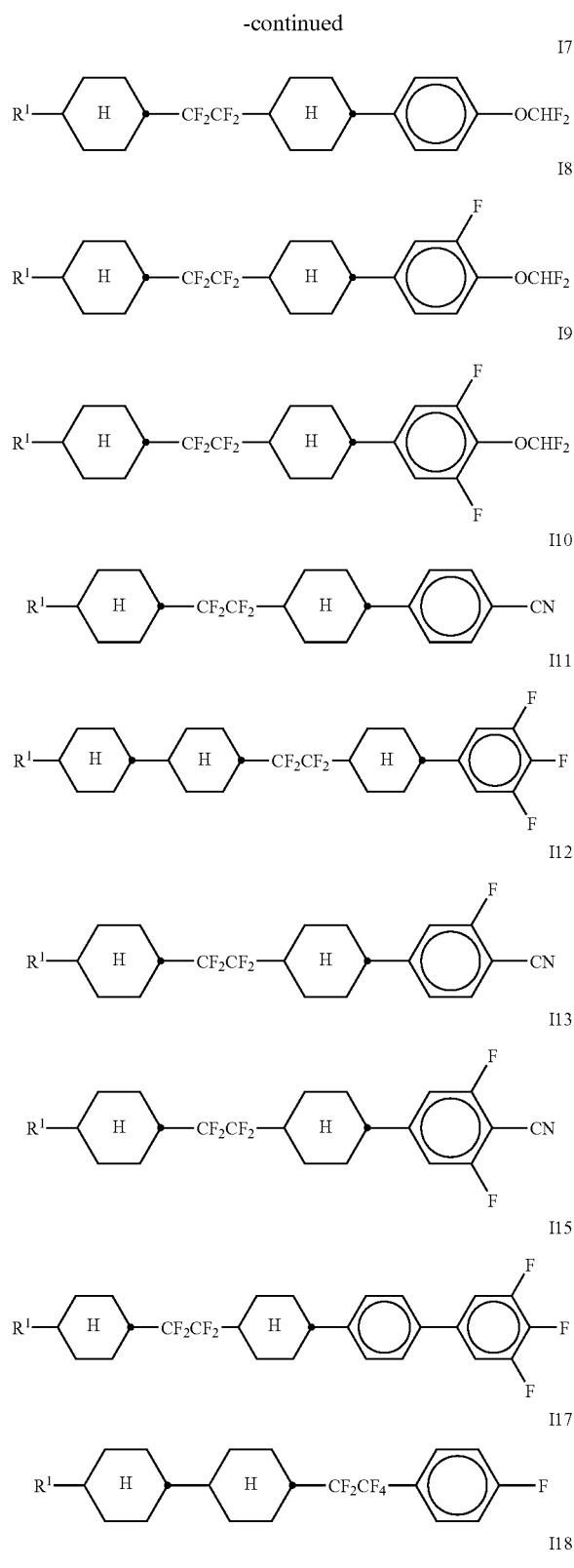
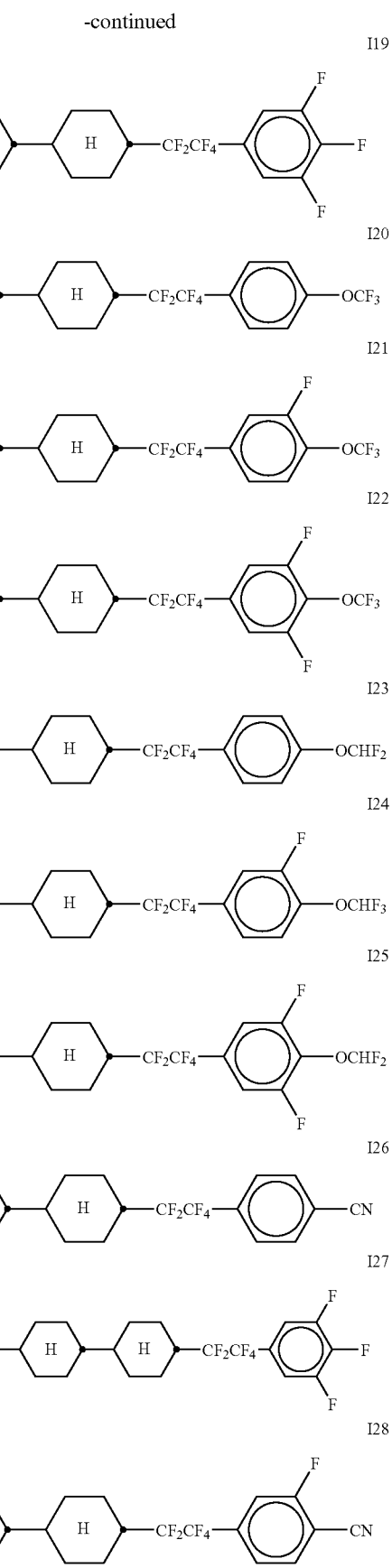

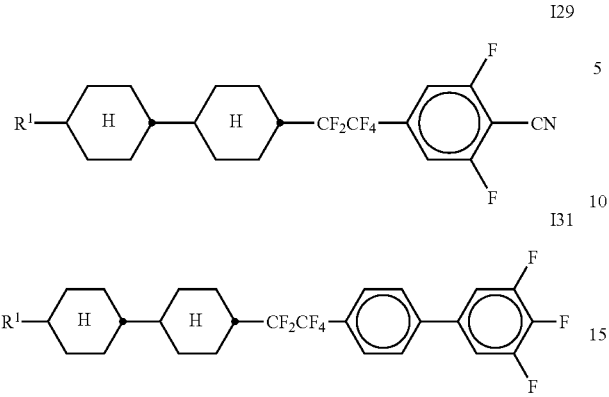

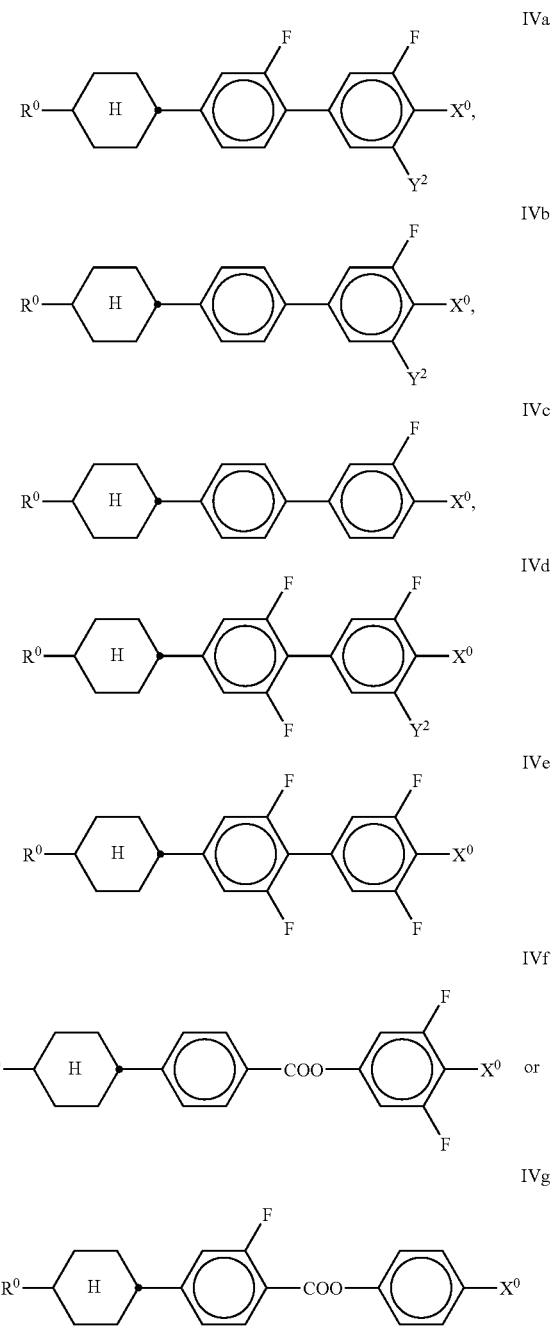

16. A medium according to claim 1, wherein said X is F, Cl, CN, OCN, NCS, SCN, OCH$_3$, CH$_3$, OC$_2$H$_5$, C$_2$H$_5$, OC$_3$H$_7$, C$_3$H$_7$, CF$_3$, CF$_2$H, OCF$_3$, OCF$_2$H, OCFHCF$_3$, OCFHCH$_2$F, OCFHC$_2$HF, OCF$_2$CH$_3$, OCF$_2$CH$_2$F, OCF$_2$CHF$_2$, OCF$_2$CF$_2$CF$_2$H, OCF$_2$CF$_2$CH$_2$F, OCFHCF$_2$CF$_3$, OCFHCF$_2$CHF$_2$, OCFHCFHCF$_3$, OCH$_2$CF$_2$CF$_3$, OCF$_2$CF$_2$CF$_3$, OCF$_2$CFHCHF$_2$, OCF$_2$CH$_2$CHF$_2$, OCFHCF$_2$CHF$_2$, OCFHCFHCHF$_2$, OCFHCH$_2$CF$_3$, OCH$_2$CFHCF$_3$, OCH$_2$CF$_2$CHF$_2$, OCF$_2$CFHCH$_3$, OCF$_2$CH$_2$CHF$_2$, OCFHCF$_2$CH$_3$, OCFHCFHCHF$_2$, OCFHCH$_2$CF$_3$, OCH$_2$CF$_2$CHF$_2$, OCH$_2$CFHCHF$_2$, OCF$_2$CH$_2$CH$_3$, OCFHCFHCH$_3$, OCFHCH$_2$CHF$_2$, OCH$_2$CF$_2$CH$_3$, OCH$_2$CFHCHF$_2$, OCH$_2$CH$_2$CHF$_2$, OCHCH$_2$CH$_3$, OCH$_2$CFHCH$_3$, OCH$_2$CH$_2$CHF$_2$, OCClFCF$_3$, OCClFCClF$_2$, OCClFCHF$_2$, OCFHCCl$_2$F, OCClFCHF$_2$, OCClFCClF$_2$, OCF$_2$CHCl$_2$, OCF$_2$CHCl$_2$, OCF$_2$CCl$_2$F, OCF$_2$CClFH, OCF$_2$CClF$_2$, OCF$_2$CF$_2$CClF$_2$, OCF$_2$CF$_2$CCl$_2$F, OCClFCF$_2$CF$_3$, OCClFCF$_2$CHF$_2$, OCClFCF$_2$CClF$_2$, OCClFCFHCF$_3$, OCClFCClFCF$_3$, OCCl$_2$CF$_2$CF$_3$, OCClHCF$_2$CF$_3$, OCClFCF$_2$CF$_3$, OCClFCClFCF$_3$, OCF$_2$CClFCHF$_2$, OCF$_2$CF$_2$CCl$_2$F, OCF$_2$CCl$_2$CHF$_2$, OCF$_2$CH$_2$CClF$_2$, OCClFCF$_2$CFH$_2$, OCFHCF$_2$CCl$_2$F, OCClFCFHCHF$_2$, OCClFCClFCF$_2$H, OCFHCFHCClF$_2$, OCClFCH$_2$CF$_3$, OCFHCCl$_2$CF$_3$, OCCl$_2$CFHCF$_3$, OCH$_2$CClFCF$_3$, OCCl$_2$CF$_2$CF$_2$H, OCH$_2$CF$_2$CClF$_2$, OCF$_2$CClFCH$_3$, OCF$_2$CFHCCl$_2$H, OCF$_2$CCl$_2$CFH$_2$, OCF$_2$CH$_2$CCl$_2$F, OCClFCF$_2$CH$_3$, OCFHCF$_2$CCl$_2$H, OCClFCClFCHF$_2$, OCFHCFHCCl$_2$F, OCClFCH$_2$CF$_3$, OCFHCCl$_2$CF$_3$, OCCl$_2$CF$_2$CFH$_2$, OCH$_2$CF$_2$CCl$_2$F, OCCl$_2$CFHCF$_2$H, OCClHCClFCF$_2$H, OCF$_2$CClHCClH$_2$, OCF$_2$CH$_2$CCl$_2$H, OCClFCFHCH$_3$, OCF$_2$CClFCCl$_2$H, OCClFCH$_2$CFH$_2$, OCFHCCl$_2$CFH$_2$, OCCl$_2$CF$_2$CH$_3$, OCH$_2$CF$_2$CClH$_2$, OCCl$_2$CFHCFH$_2$, OCH$_2$CClFCFCl$_2$, OCH$_2$CH$_2$CF$_2$H, OCClHCClHCF$_2$H, OCH$_2$CCl$_2$CF$_2$H, OCClFCH$_2$CH$_3$, OCFHCH$_2$CCl$_2$H, OCClHCFHCClH$_2$, OCH$_2$CFHCCl$_2$H, OCCl$_2$CH$_2$CF$_2$H, OCH$_2$CCl$_2$CF$_2$H, CH=CF$_2$, OCH=CF$_2$, CF=CF$_2$, OCF=CF$_2$, CF=CHF, OCF=CHF, CH=CHF, OCH=CHF, CF$_2$CH$_2$CF$_3$, or CF$_2$CHFCF$_3$.

17. A medium according to claim 1, wherein said X is F, Cl, CN, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$, CH=CHF$_2$, OCH$_3$, OC$_2$H$_5$ or OC$_3$H$_7$.

18. A medium according to claim 2, wherein said compound of the formula IV is

19. A medium according to claim 1, wherein said medium further comprises one or more dioxanes of formulae D1 to D4:

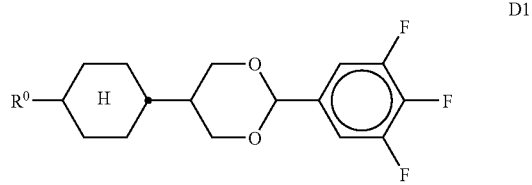

-continued

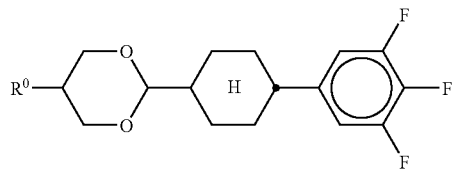
D2

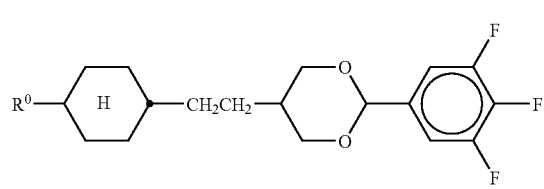
D3

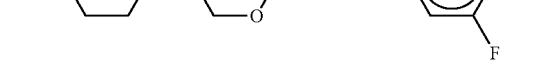
D4 wherein R⁰ n-alkyl, oxaalkyl, fluoroalkyl or alkenyl, each having up to 9 carbon atoms.

20. A medium according to claim 1, wherein said medium further comprises one or more compounds selected from formulae IX to XVIII:

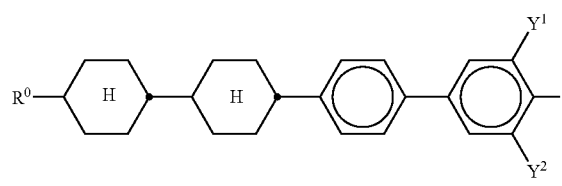
IX

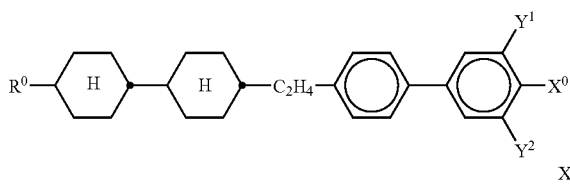
X

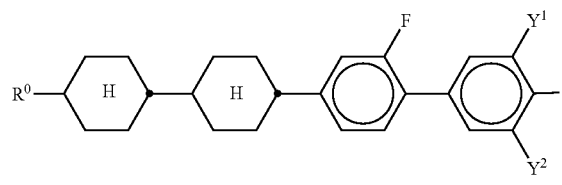
XI

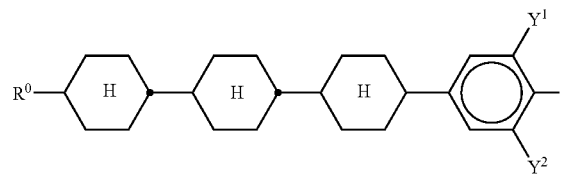
XII

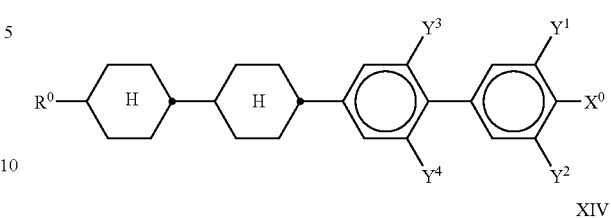
XIII

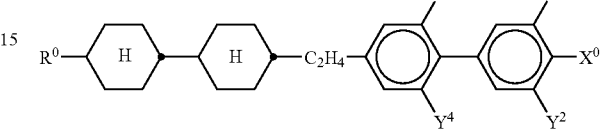
XIV

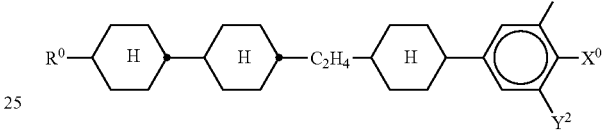
XV

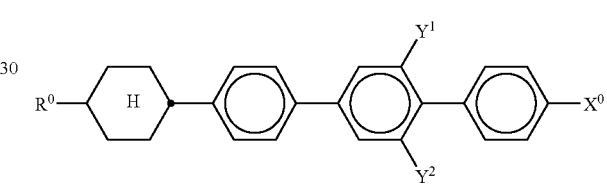
XVI

XVII

XVIII wherein

R⁰ is n-alkyl, oxaalkyl, fluoroalkyl or alkenyl, each having up to 9 carbon atoms, X⁰ is F, Cl, halogenated alkyl, alkenyl or alkoxy having from 1 to 6 carbon atoms, and Y¹ and Y² are each, independently of one another, H or F.

21. A medium according to claim 20, wherein X⁰ is F, Cl, CF₃, OCF₃ or OCHF₂, and R⁰ is alkyl, oxaalkyl, fluoroalkyl or alkenyl, each having up to 6 carbon atoms.

22. A liquid-crystalline medium containing a mixture of polar compounds of positive or negative dielectric anisotropy, said medium comprising one or more compounds of formula I

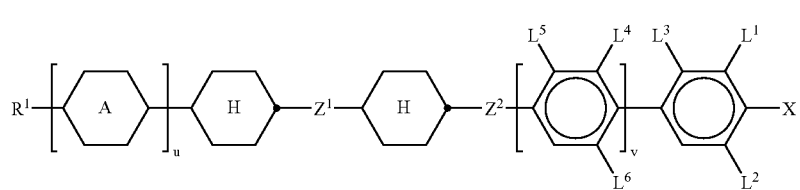

in which

R¹ is an alkyl radical having from 1 to 12 carbon atoms which is unsubstituted, monosubstituted by CN or CF₃ or at least monosubstituted by halogen, where one or more CH₂ groups in these radicals may also, in each case independently of one another, be replaced by —O—, —S—,

—CH=CH—, —C≡C—, —CO—, —CO—O—, —O—CO— or —O—CO—O— in such a way that O atoms are not linked directly to one another,

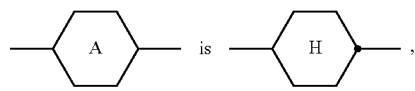

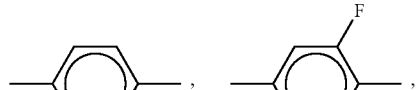

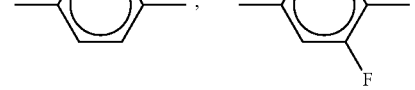

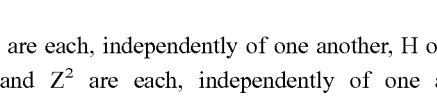

L¹⁻⁶ are each, independently of one another, H or F,

Z¹ and Z² are each, independently of one another, —CF₂CF₂— or a single bond, where Z¹≠Z², X is F, Cl, CN, OCN, NCS, SCN, an unsubstituted alkyl or alkoxy radical, a halogenated alkyl radical, a halogenated alkenyl radical, a halogenated alkoxy radical or a halogenated alkenyloxy radical having up to 6 carbon atoms, and u is 0 or 1, and v is 0 or 1, wherein

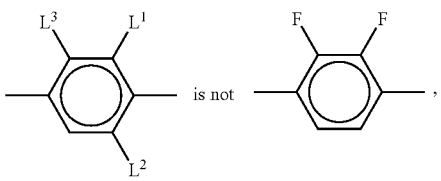

and wherein said medium further comprises one or more compounds having fused rings of formulae A-1 to A-6:

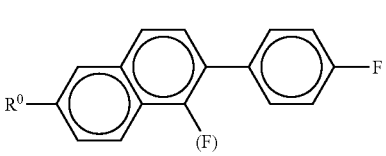

A-1

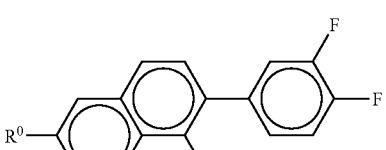

A-2

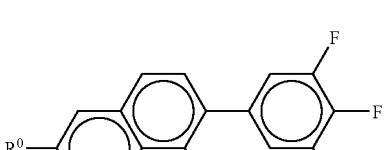

A-3

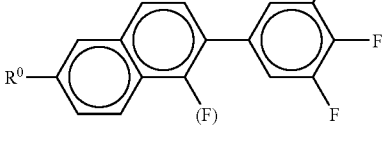

A-4

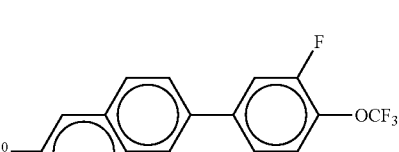

A-5

-continued

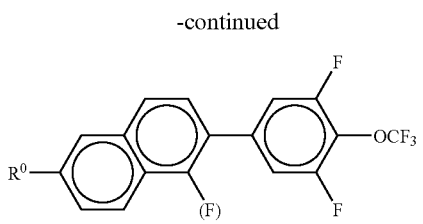
A-6 wherein R⁰ is n-alkyl, oxaalkyl, fluoroalkyl or alkenyl, each having up to 9 carbon atoms.

23. A medium according to claim 22, wherein said medium contains 3–15% by weight of compounds of formulae A-1 to A-6.

24. A medium according to claim 2, wherein the proportion of compounds of formulae I to VIII together in the mixture as a whole is at least 30% by weight.

25. A medium according to claim 1, wherein the proportion of compounds of formula in the mixture as a whole is from 1 to 50% by weight.

26. A medium according to claim 2, wherein the proportion of compounds of formulae II to VIII in the mixture as a whole is from 20 to 80% by weight.

27. A medium according to claim 25, wherein the proportion of compounds of formulae II to VIII in the mixture as a whole is from 20 to 80% by weight.

28. A medium according to claim 1, wherein

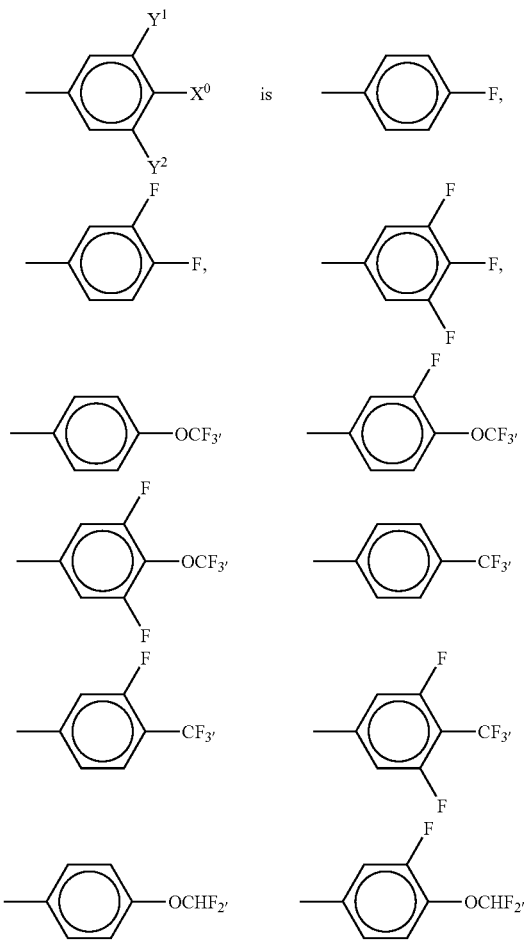

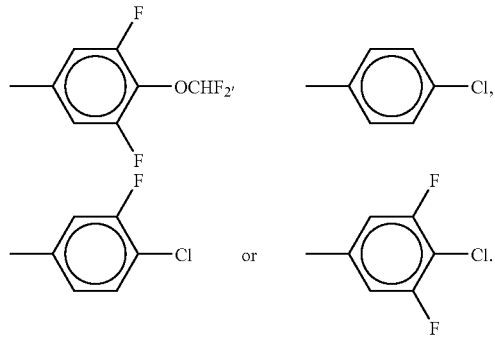

29. A medium according to claim 2, wherein the medium comprises one or more compounds in which is straight-chain alkyl or alkenyl having from 2 to 7 carbon atoms.

30. A medium according to claim 1, wherein the medium comprises one or more compounds of formula I in which $R^1$ is methyl, ethyl, n-$C_3H_7$, n-$C_4H_9$, n-$C_5H_{11}$ or n-$C_6H_{11}$.

31. A medium according to claim 1, wherein the medium further comprises one or more compounds of formulae XIX to XXII:

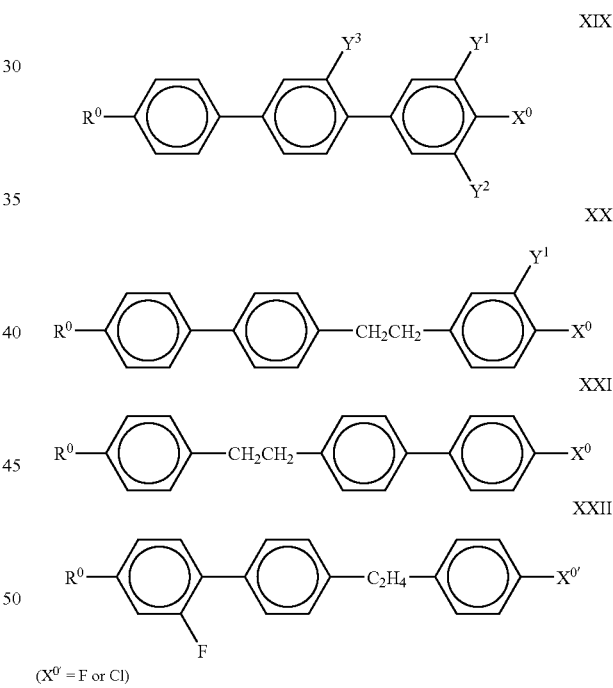

wherein
$R^0$ is n-alkyl, oxaalkyl, fluoroalkyl or alkenyl, each having up to 9 carbon atoms,
$X^0$ is F, Cl, halogenated alkyl, alkenyl or alkoxy having from 1 to 6 carbon atoms,
$Y^1$, $Y^2$, and $Y^3$ are each, independently of one another, H or F, and
the 1.4-phenylene rings are unsubstituted or substituted by methyl, CN, chlorine or fluorine.

32. A medium according to claim 1, wherein the medium further comprises one or more compounds of formula XXIII

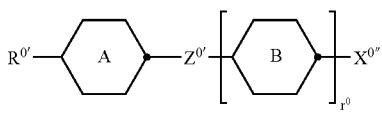
XXIII where

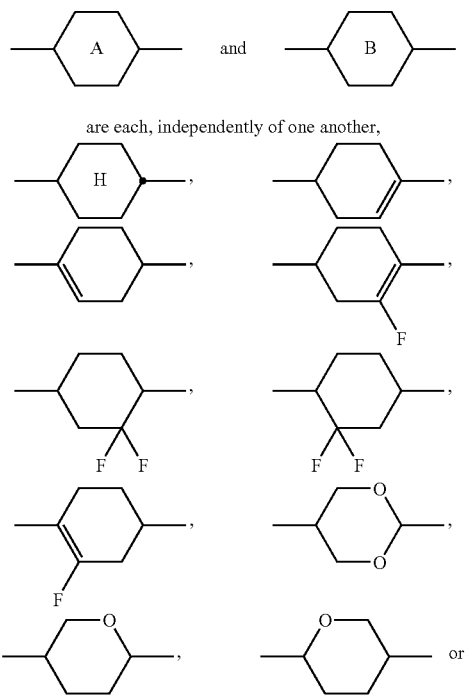

are each, independently of one another,

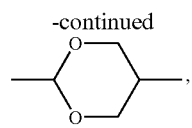

$Z^{0'}$ is a single bond, —$C_2H_4$—, —$C_4H_8$—, —COO—, —O—CO—, —$CF_2O$— or —$OCF_2$, $r^0$ is 1 or 2, $R^{0'}$ is n-alkyl, oxaalkyl, fluoroalkyl or alkenyl, each having up to 9 carbon atoms, and $X^{0'}$ is $OCF_3$, F, Cl, $CF_3$, alkyl or alkoxy.

33. A medium according to claim 32, wherein the proportion of the compounds of the formula XXIII in the medium is 5–40% by weight.

34. A medium according to claim 1, wherein the voltage holding ratio is at least 96.4%.

35. A medium according to claim 1, wherein said medium has a rotational viscosity $\gamma_1$ at 20° C. of <180 mPa·s.

36. A medium according to claim 1, wherein said medium has a rotational viscosity $\gamma_1$ at 20° C. of <150 mPa·s.

37. A medium according to claim 1, wherein said medium has a rotational viscosity $\gamma_1$ at 20° C of 130 mPa·s–180 mPa·s.

38. A medium according to claim 34, wherein said medium has a rotational viscosity $\gamma_1$ at 20° C. of <180 mPa·s.

39. A medium according to claim 34, wherein said medium has a rotational viscosity $\gamma_1$ at 20° C. of <150 mPa·s.

40. A medium according to claim 34, wherein said medium has a rotational viscosity $\gamma_1$ at 20° C. of 130 mPa·s –180 mPa·s.

* * * * *

UNITED STATES PATENT AND TRADEMARK OFFICE
CERTIFICATE OF CORRECTION

PATENT NO. : 7,078,079 B2
APPLICATION NO. : 10/433002
DATED : July 18, 2006
INVENTOR(S) : Michael Heckmeier et al.

It is certified that error appears in the above-identified patent and that said Letters Patent is hereby corrected as shown below:

Column 59, line 67, reads "$OCHF_2or$" should read -- $OCHF_2$ or --
Column 60, line 10, reads "a clearing points" should read -- a clearing point --
Column 60, line 14, reads "a clearing points" should read -- a clearing point --
Column 61 – 63, formulae I17 – I31, the linking group reads "$CF_2CF_4$" should read -- $CF_2CF_2$ --
Column 65, line 28, reads "$R^0$ n-alkyl" should read -- $R^0$ is n-alkyl --
Column 70, line 18, reads "in which is" should read -- in which $R^0$ is --
Column 70, line 64, reads "the 1.4-phenylene" should read -- the 1,4-phenylene --
Column 72, line 9, reads "$-OCF_2,$" should read -- $-OCF_2-$, --
Column 72, line 14, reads "$X^{0'}$ is" should read -- $X^{0''}$ is --

Signed and Sealed this

Nineteenth Day of August, 2008

JON W. DUDAS
*Director of the United States Patent and Trademark Office*